Feb. 3, 1948.  R. ADLER  2,435,487
ELECTROMECHANICAL VIBRATOR
Filed Feb. 1, 1943  8 Sheets-Sheet 1

INVENTOR
ROBERT ADLER
BY David M. Davis
HIS ATTORNEY

Feb. 3, 1948.   R. ADLER   2,435,487
ELECTROMECHANICAL VIBRATOR
Filed Feb. 1, 1943   8 Sheets-Sheet 2

INVENTOR
ROBERT ADLER
BY David M. Davis
HIS ATTORNEY

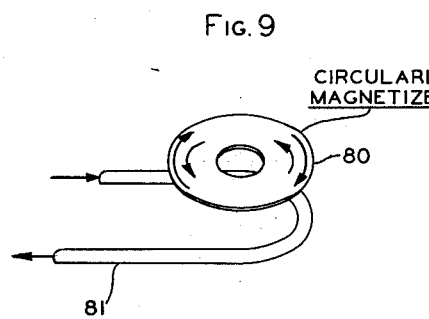
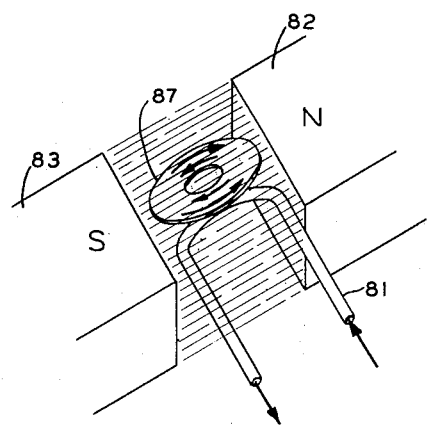
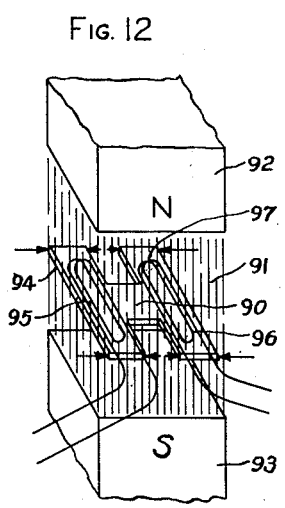
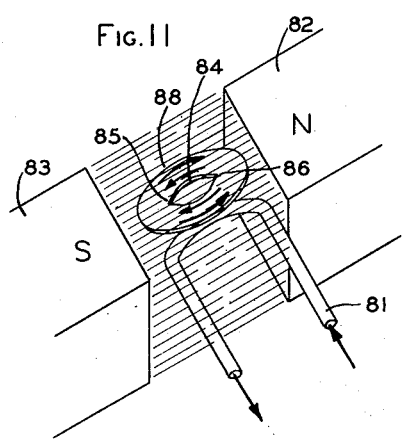
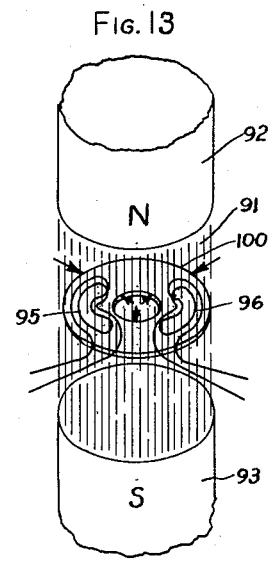
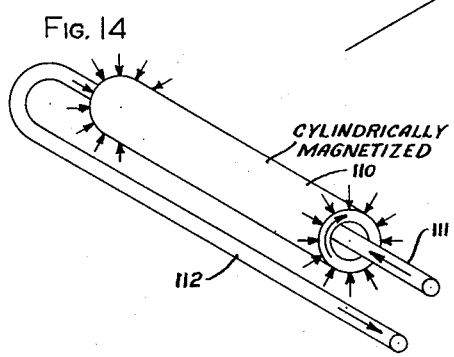

Feb. 3, 1948.     R. ADLER     2,435,487
ELECTROMECHANICAL VIBRATOR
Filed Feb. 1, 1943     8 Sheets-Sheet 4
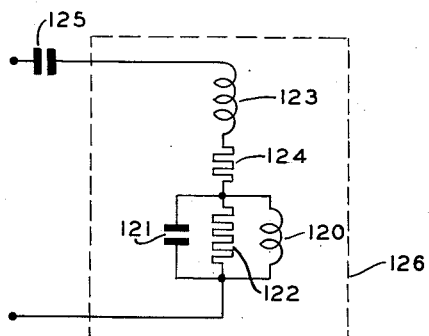
Fig. 15
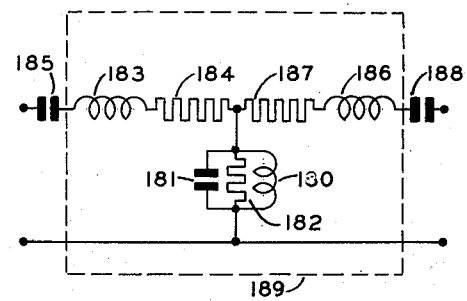
Fig. 16
EQUIVALENT CIRCUIT
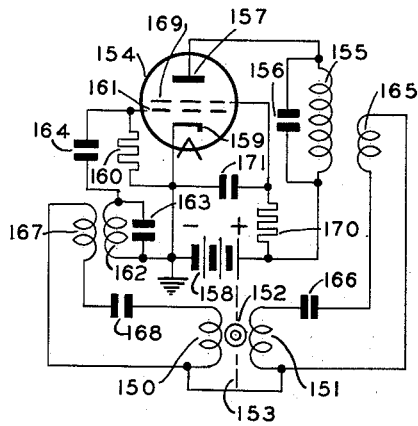
Fig. 17
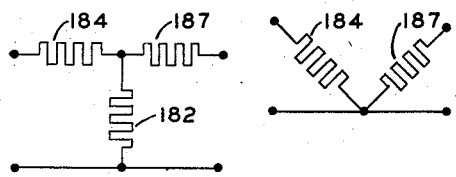
Fig. 18
Fig. 19     Fig. 20
INVENTOR
ROBERT ADLER
BY David M. Davis
HIS ATTORNEY Feb. 3, 1948.  R. ADLER  2,435,487
ELECTROMECHANICAL VIBRATOR
Filed Feb. 1, 1943  8 Sheets-Sheet 5
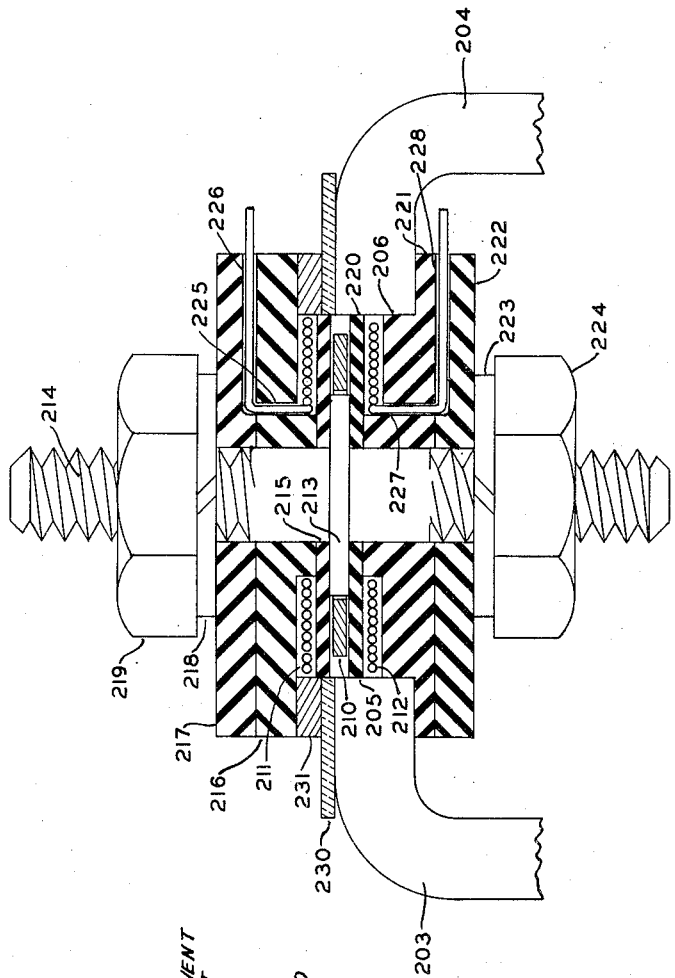
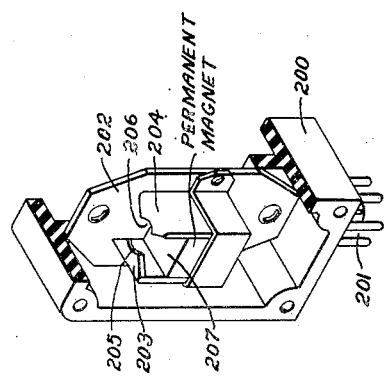
INVENTOR
ROBERT ADLER
BY David M. Davis
HIS ATTORNEY

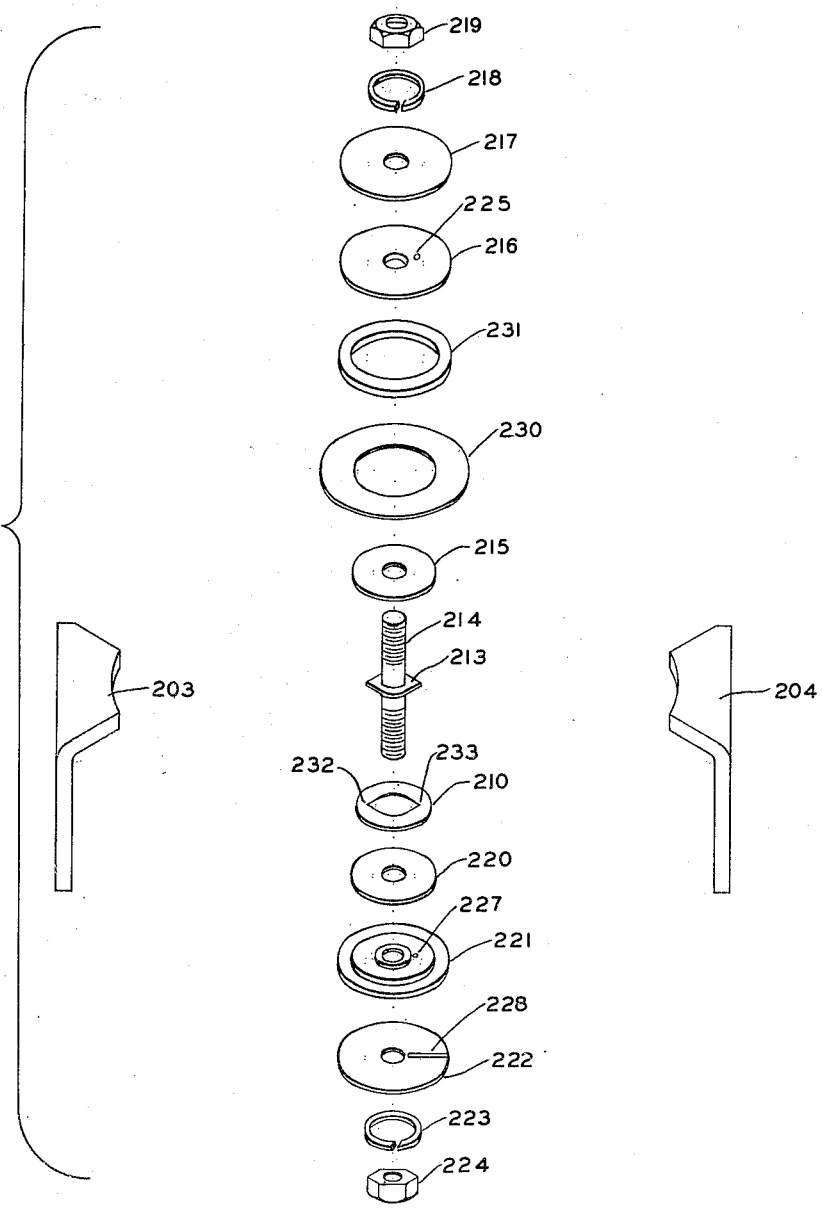

Feb. 3, 1948. R. ADLER 2,435,487
ELECTROMECHANICAL VIBRATOR
Filed Feb. 1, 1943 8 Sheets-Sheet 7

INVENTOR
ROBERT ADLER
BY David M. Davis
HIS ATTORNEY

Feb. 3, 1948.   R. ADLER   2,435,487
ELECTROMECHANICAL VIBRATOR
Filed Feb. 1, 1943   8 Sheets-Sheet 8

INVENTOR
ROBERT ADLER
BY David M. Davis
HIS ATTORNEY

Patented Feb. 3, 1948

2,435,487

UNITED STATES PATENT OFFICE 2,435,487

ELECTROMECHANICAL VIBRATOR

Robert Adler, Chicago, Ill., assignor to Zenith Radio Corporation, a corporation of Illinois Application February 1, 1943, Serial No. 474,290

33 Claims. (Cl. 250—36)

1

This invention relates to mechanical oscillating systems, and more particularly to such systems in which energy is transferred between an electrical circuit and a mechanically resonant body.

Heretofore, naturally occurring quartz and tourmaline crystals have been cut into small bodies capable of oscillation at high frequencies in the order of one-quarter megacycle and upward. Such crystals, suitable for forming such high frequency mechanical oscillators, are not common and, after being properly cut and ground to shape, are very expensive.

Attempts have been made in the past to provide other types of mechanical systems capable of vibrating at high frequencies of the order of one-half megacycle and upwards. Such attempts have not in general been successful. It is very desirable, because of the scarcity of suitable naturally formed crystals for the manufacture of quartz crystal oscillators, that a cheap, easily constructed mechanical vibrator be provided which is capable of oscillating at high frequencies of the order of one-quarter megacycle and upward. Such mechanical oscillating systems are very desirable for use in oscillation generators and the like in which a high degree of frequency stability must be maintained.

It is, accordingly, an object of my invention to provide a new and improved mechanical oscillating system capable of oscillating at high frequencies of the order of one-quarter megacycle and upwards.

It is a corollary object of my invention to provide such a new and improved mechanical oscillating system which is cheap and easily constructed of materials which are readily attainable.

When naturally formed crystals, such as quartz crystals, are so cut that they are capable of acting piezo-electrically at a predetermined frequency to maintain constant frequency operation of an oscillator, they have an undesirable characteristic when used as a filter, in that not only currents of such predetermined frequency, but also currents of other discrete frequencies, are transmitted, often near the predetermined frequency. Such undesired frequency responses of a crystal sometimes cause it to oscillate, when used in an oscillator circuit, at undesired frequencies, and frequently cause the crystal to be useless when it is employed as a filter.

It is a further object of my invention to provide a new and improved mechanical oscillating system in which such spurious responses at frequencies near the desired frequency either do not

2 exist at all or exist in such small amounts at frequencies so far spaced from the desired frequency as to have no effect on its operation.

It is similarly an object of my invention to provide a new and improved mechanical oscillating system which is highly useful when driven electrically as an electrical filter system.

It is also an object of my invention to provide new and improved means for exciting such a mechanical oscillating system into oscillation and further to maintain it in continuous undamped oscillation at its stable frequency. It is still further an object of my invention to provide a new and improved holder for such a mechanical oscillating system associated with means for exciting it from an electrical circuit, and with means for maintaining the system at a constant temperature.

It is another object of my invention to provide such a system which is affected in minimum amounts by changes of ambient temperature.

Still another object of the present invention is to provide an improved method for vibrating a metallic body.

The features of my invention which I believe to be novel are set forth with particularity in the appended claims. My invention itself, both as to its organization and manner of operation, together with further objects and advantages thereof may best be understood by reference to the following description taken in connection with the accompanying drawings in which:

Figures 1 through 14 are illustrations of various modifications of my invention;

Figures 15 through 20 are circuit diagrams illustrating various characteristics of oscillation generating circuits including my invention;

Figures 21 through 25 are details of various views of a preferred embodiment of my invention;

Figure 26:
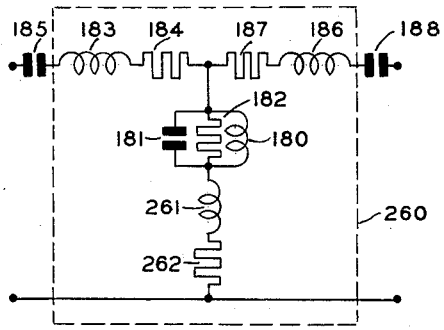
Figure 27:
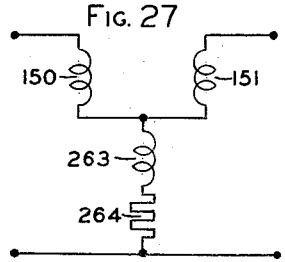
Figure 28:
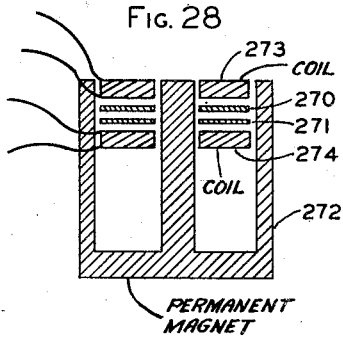

Figures 26 and 27, respectively illustrate an equivalent circuit and an actual circuit for an embodiment of my invention;

Figure 28 illustrates still another embodiment of my invention; and

Figure 29:
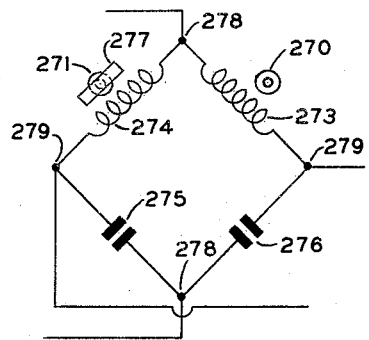
Figure 30:
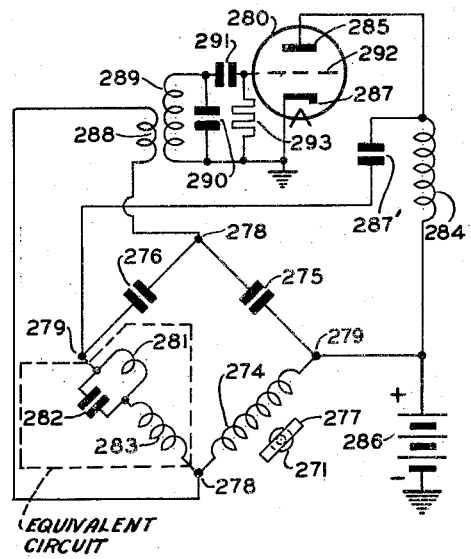

Figures 29 and 30, respectively, illustrate circuits suitable for use with the embodiment of Figure 28.

Figure 1:
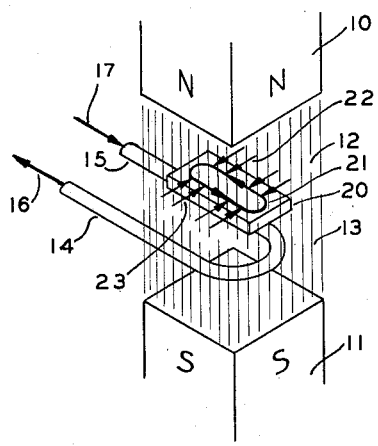

In Figure 1 the two opposite poles 10 and 11 of a magnet face each other across a gap 12 through which magnetic flux is forced by the magnetomotive force of the magnet poles 10 and 11. Lines 13 extending between the poles 10 and 11 represent such magnetic flux. The magnetomotive force giving rise to such flux between the poles 10 and 11 may be provided by permanent magnetization of the poles, or may be induced by electromagnetic action. It is preferred for the sake of simplicity that this magnetomotive force be set up by permanent magnetization in the magnetic circuit connecting the two poles 10 and 11.

A looped conductor having parallel legs 14 and 15 is placed in the gap 12 so that the plane of the loop is perpendicular to the magnetic flux line 13. A regularly shaped thin piece 20 of conducting material, which is not ferromagnetic, and which may be formed of aluminum or copper, for example, is placed in the gap 12 between poles 10 and 11 with its major dimensions lying in a plane substantially parallel to the plane ow the looped conductor 14, 15.

Arrows 16 and 17 indicate that current flows in through the leg 15 and out through leg 14 of the looped conductor. The oval 21 upon the conductive body 20, with its arrowheads, indicates that current flows in the body 20. It is a well known fact that alternating current flowing in a loop induces an alternating voltage and a resulting alternating current in an adjacent conducting loop. The arrows 16 and 17 and the oval 21 are intended to represent such current, the current 21 being substantially of opposite phase to the current 16, 17 in the looped conductor 14, 15. The arrows 16 and 17 and the arrowheads in the oval 21 represent flow of current in the system at a particular instant when the alternating currents are of substantial intensity different from zero.

Since the flux lines 13 pass through the body 20 in a direction perpendicular to the major faces of the body 20, flow of the current 21 in the body 20 is accompanied by forces acting at the instant of existence of currents 16, 17 and 21 generally as indicated by the arrows 22 and 23. On the near side of the conductive body 20 current flows in the loop 21 from left to right, and flux 13 passes downwardly between the magnet poles 10 and 11, so that a resulting force tends to move the front edge of the body 20 backwards, as indicated by arrows 23. Similarly, the current 21 flowing in the back edge of the conductive body 20 from right to left through the flux 13 is accompanied by a force tending to move the back edge of the conductive body 20 toward its front edge, as indicated by the arrows 22.

At an instant of time when currents 16, 17 and 21 are flowing in directions opposite to those indicated, reaction between the current 21 and flux 13 is in opposite directions so that the forces 22 and 23 are oppositely directed from those illustrated. That is, at such instant of time forces 22 tend to move the back edge of the body backward and forces 23 to move the front edge of the body forward.

Under the influence of periodic forces suitably applied to the body 20, that body is capable of oscillation in any direction along the body in which there is a maximum or minimum motional impedance. One such possible direction of oscillation is indicated by the arrows 22 and 23 in Figure 1, in which the two long edges of the body 20 move alternately toward and away from each other. Another possible mode of vibration is that in which the other two opposite edges of the major faces of the body 20 move alternately toward and away from each other.

Either such mode of oscillation of the body 20 may be excited by the structure shown in Figure 1. When the alternating current flowing through the looped conductor 14, 15 has a frequency equal to the natural frequency of oscillation of the body 20 in either such mode of oscillation, the body 20 is maintained in continuous mechanical oscillation. When either such mode of oscillation is maintained continuously, it is found that the current flow produced through the looped conductor 14, 15 is less than the current flow produced through that conductor by alternating voltage of any other frequency. That is, the electrical impedance of the structure shown in Figure 1, measured across the terminals of the looped conductor 14, 15, is a maximum at the natural frequency of vibration of the body 20. It is preferred to use alternating current in conductor 14, 15 of such frequency as to maintain body 20 in continuous oscillation at the frequency determined by its width dimension, that is, in the mode illustrated. It has been found that high value of reflected motional impedance particularly useful at high frequencies can so be obtained. The term "reflected motional impedance" is explained more fully in connection with Figure 15.

The electrical characteristics of this structure of Figure 1 are set forth more fully hereinafter, as are also the electrical characteristics of various modifications of the structure of Figure 1.

It is important to note that the configuration of the body 20 is such that the forces represented by the arrows 22 and 23 act on substantially all of the mass of the body 20. That is, excitation of substantially every incremental part of the vibrating body 20 is achieved by reason of the fact that the current 21 flows as a sheet through substantially all of body 20 and reacts with flux 13 at substantially all points in the body. To this end the body 20 is made very thin in the direction of the flux lines 13, and bears an inductive relation with the looped conductor 14, 15 such that each half of the body 20 is substantially filled by a current sheet of substantial density flowing in one direction, substantially parallel to the adjacent long edge of the body 20.

It should also be noted that, although the exciting conductor 14, 15 in Figure 1 has been shown as a single turn, it is within the scope of my invention to utilize an exciting conductor having many turns electromagnetically coupled with the body 20. It will, in fact, usually be desired to utilize such an exciting conductor of many turns in most situations.

It has been found that the various electrical and mechanical factors influencing oscillation, such as moduli of elasticity and electromechanical coupling within the body 20, are especially favorable when the body 20 is formed of aluminum or molybdenum, and when the flux 13 between the poles 10 and 11 has a strength of at least 5,000 to 10,000 gauss. Oscillators of this type have been constructed which operate at frequencies as high as 2.8 megacycles. The frequency variation of such oscillators is dependent in substantial degree upon temperature variations, so that it is usually desirable to maintain these oscillators at constant temperature. The quality factor, or "Q," of such an oscillating system is very high. When the body 20 is constructed of aluminum the quality factor is between 5,000 and 10,000 and with molybdenum it is over 10,000. A complete structure such as that illustrated in Figure 1, including the permanent magnet field structure, the oscillating body 20, and the exciting conductor, can be readily constructed so as to weigh about four ounces.

The frequency of oscillation of the vibratory body 20 is determined substantially by one of the three dimensions of the body 20 which are here termed "characteristic dimensions." In the case of the body 20 shown in Figure 1, and of all other bodies of similarly rectangular and thin shape, these three characteristic dimensions are the length, the width, and the thickness. In the case of the body 20 in Figure 1, it should be noted that the body vibrates mechanically in the preferred manner in such a mode that its frequency is substantially determined by the characteristic dimension which is of intermediate magnitude, that is, the width dimension of the body. Relatively high reflected motional impedances particularly useful at high frequencies can so be obtained. The body 20 vibrates at a definite frequency determined by its width dimension, and is excited in substantially every incremental portion of its mass by reason of the fact that its thickness dimension is small. It is advantageous to keep the length dimension substantially longer than the other two in order that vibration of the body 20 shall produce a desirable electrical effect at the ends of conductor 14, 15. That is, the electrical impedance measured at the terminals of that conductor 14, 15 is high at a frequency near the natural frequency of vibration of the body 20 when the body oscillates in a mode determined by its intermediate dimension, that is, its width dimension and its length dimension is substantially greater than its width.

Figure 2:
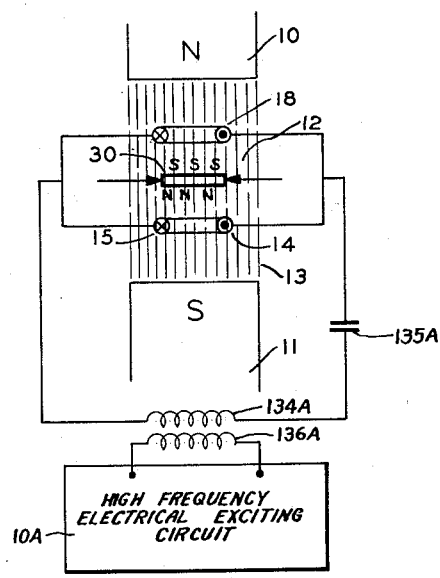

In Figure 2 a somewhat similar structure is shown which operates on different principles. In this structure certain elements are identical with those illustrated in Figure 1, and are given like reference characters. Instead of a conductive body 20, as illustrated in Figure 1, a similarly shaped ferromagnetic body 30 having three different dimensions and arranged for vibration in a mode determined by its intermediate dimension is utilized in much the same spaced relation. The term ferromagnetic body means one capable of having magnetic poles induced in it in the presence of magnetic flux. Since the body 30 is ferromagnetic, being formed of some material such as iron, it is magnetically polarized by the flux 13 and the gap 12 between the poles 10 and 11, and magnetic poles form on its opposite faces as indicated in Figure 2. As illustrated, the upper face of the ferromagnetic body 30 becomes a south magnetic pole, and the lower face a north magnetic pole. Also, in addition to the looped conductor 14, 15 between body 30 and pole 11, another similar looped conductor 18 is similarly placed between body 30 and pole 10.

Current flowing, as illustrated, through the looped conductor including legs 14 and 15 into leg 15 and out of leg 14 forms a magnetic field at the right lower edge of the ferromagnetic body 30, such that a north magnetic pole tends to move in a counter-clockwise direction around the leg 14 of the conductor as indicated in Figure 2. Similarly, at the lower left edge of the body 30, the magnetic field is such, due to the current flowing in the leg 15, that a north magnetic pole tends to move clockwise around the leg 15. Resultant forces are therefore produced when current flows in the leg 15 and back out the leg 14, as illustrated, which tend to move the right and left-hand edges of the body 30 toward each other, since the south magnetic poles on the upper surface of the body 30 are to a large extent shielded from the action of the magnetic flux produced by current in the looped conductor 14, 15.

In similar fashion, current flowing, as illustrated, through the looped conductor 18 into the left-hand leg and out the right-hand leg forms a magnetic field at the right upper edge of the ferromagnetic body 30, such that a south magnetic pole tends to move in a clockwise direction around the right-hand leg of the conductor 18. Also, at the upper left edge of the body 30, the magnetic field is such, due to the current flowing in the left leg of conductor 18, that a south magnetic pole tends to move counter-clockwise around the left leg of conductor 18. Resultant forces are therefore produced when current flows in the conductor 18, as illustrated, which forces tend to move the right and left-hand edges of the body 30 toward each other, since the north magnetic poles on the lower surface of the body 30 are to a large extent shielded from the action of the magnetic flux produced by current in the looped conductor 18.

Since the forces on the upper and lower surfaces of the body 30 act together, when current flows as illustrated through conductors 14, 15 and 18 the body 30 tends to become smaller in its width dimension.

A reversal of the current flowing through the two looped conductors 14, 15 and 18 produces a reversal of such forces, which thereupon tend to move the edges of the body 30 apart. When the current in the looped conductors is periodically reversed at a frequency equal to a natural frequency of mechanical vibration of the body 30, the body 30 is maintained in vibration, and the electrical impedance of the structure shown in Figure 2, measured across the terminals of the looped conductor including arms 14 and 15, is affected in the same manner as the impedance of the structure illustrated in Figure 1. The ferromagnetic body has several different possible modes of vibration, similarly to the conductive body 20 of Figure 1.

In Figure 2, inasmuch as current flows through coil 18 and the coil comprising legs 14, 15 in the manner indicated, such coils may be supplied with current from the same source and for purposes of the present specifications these conductors may be considered as one coil.

It is important to note with the structure of Figure 2, as noted with the structure of Figure 1, that the ferromagnetic body 30 must be thin, so that the electromagnetically induced forces are effective substantially throughout the entire mass of the body. When this condition is assured, coupling between the exciting electrical circuit and the body is most efficient, and internal friction in the body itself is sufficiently small even at very high frequencies to produce only a small amount of damping within the body relative to the energy accumulated in the mechanical oscillation of the body, whereby the body oscillates strongly at a definite frequency. Such an electrical exciting circuit 10A for producing high frequency oscillations may be connected to the coil 18 and the coil comprising legs 14, 15 in a manner similar to the way the vibrator of Figure 1 is connected as shown in Figures 15 and 16. The connected coils 14, 15, 18 may as in Figures 16 and 17 be connected by a coupling condenser 135A to the primary winding 134A of a coupling transformer the secondary winding 136A of which may be coupled to the high frequency electrical exciting circuit 10A which circuit may be an oscillatory circuit of the type shown in Figure 16.

It is of course to be understood that the entire mass of an oscillating body excited in accordance with my invention is not excited into oscillation, although substantially all of the mass is so excited. The reason why all of the mass is not excited may be explained by reference to the body 20 in Figure 1, in connection with which it is clear that a central portion of the body 20 carries substantially no current represented by the loop 21, and so is not excited. In similar fashion the body 30 in Figure 2 is not centrally excited because of the fact that there is no reaction in such central portions between an induced magnetic pole and alternating flux caused by current flow in the conductors 14, 15 or 18. It is therefore to be understood that I mean by saying that the vibrating body is excited in substantially every incremental portion of its mass that at least a very large part of the body is acted upon directly by exciting forces. It is only by such efficient excitation that desirable electric characteristics can be attained, which make possible the maintenance of continuous oscillation of such bodies at high frequencies above a quarter megacycle.

Figure 3:
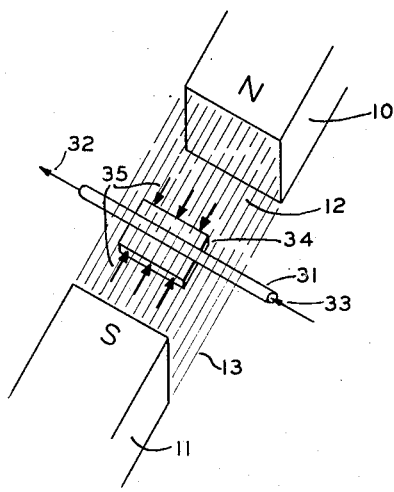

In Figure 3 there is illlustrated another modification of my invention in which certain elements are identical with those illustrated in Figures 1 and 2 and are given like reference characters. In the gap 12 between poles 10 and 11 through which the flux 13 passes, a conductor 31 is placed in a plane at right angles to the direction of the flux 13. As illustrated by the arrows 32 and 33, current passes through this conductor 31 from right to left. At a little distance from the conductor 31, parallel to the conductor 31, and parallel to the flux 13 in the gap 12, there is placed a magnetostrictive body 34 whose dimensions are small in directions perpendicular to the conductor 31 and perpendicular to the flux 13. By the term magnetostrictive body is meant one whose dimensions change when the body is in the presence of a magnetic field.

Assuming that the material of which the body 34 is formed is such that its dimensions decrease in directions parallel to magnetic lines of force within which the body lies, current flowing through the conductor 31 from right to left, as indicated by the arrows 32 and 33, produces a magnetic field through the body 34 of which a component adds to the field 13 flowing through the body 34 between the poles 10 and 11, resulting in a set of forces, represented by the arrows 35, which tend to move the two edges of the body 34 nearest the poles 10 and 11 toward each other.

Upon a reversal in the direction of current flow through the conductor 31 from that indicated by the arrows 32 and 33, the resultant magnetic field within which the body 34 lies is weakened, instead of being strengthened as previously, and its two edges nearest the poles 10 and 11 are subject to forces which tend to move those edges away from each other. If the flow of current through the conductor 31 be reversed alternately at a frequency equal to a natural frequency of vibration of the body 34 in that mode which may be called the "width" mode, the frequency being determined by the width dimension of the body, mechanical oscillations of the body 34 are electromagnetically induced. Since substantially the entire mass of the body 34 is excited by the electromagnetically induced forces into such oscillation, electromechanical coupling between the conductor 31 and the body 34 is favorably large and the body 34 may be maintained in continuous oscillation even though it oscillates at high frequencies. The impedance of the structure as measured between the ends of the conductor 31, is affected in a way similar to that of the structures illustrated in Figures 1 and 2.

I have so far described three general types of electromechanical vibrating systems, illustrated in Figures 1, 2 and 3. The system illustrated in Figure 1 is maintained in sustained electromechanical vibration by reason of the reaction between a fixed magnetic field and a current, induced from a driving source and flowing in a vibrating body which is made of conductive material. The system illustrated in Figure 2 is maintained in sustained electromechanical vibration by reason of the reaction between an alternating electromagnetic field, driven from a source of alternating voltage, and magnetic poles induced in an electromechanically vibrating body by a fixed magnetic field, the vibrating body being of ferromagnetic material. The system illustrated in Figure 3 is maintained in sustained electromechanical vibration by reason of alternate changes in dimensions of the body caused by magnetostrictive effect from alternating changes in the intensity of an electromagnetic field in which the body lies, the vibrating body being formed of material which is subject to magnetostriction.

Figure 4:
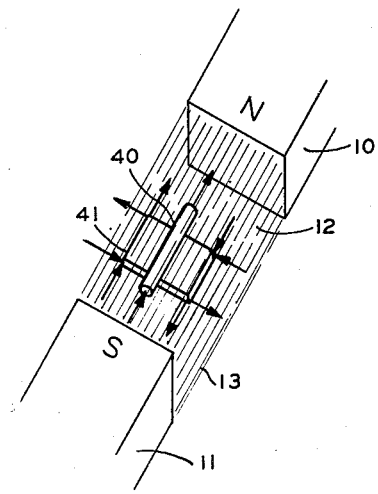

In Figure 4, I illustrate another modification of my invention, somewhat similar to that shown in Figure 3, and in which certain elements, identical with those illustrated in the preceding figures, are given like reference characters. In the system here illustrated, sustained mechanical oscillation is maintained by reason of the magnetostrictive effect produced in a vibrating body by a composite field formed of a fixed magnetic field and an alternating magnetic field differently directed and driven from a source of alternating voltage. In the space 12 in which the magnetic field 13 exists between poles 10 and 11 a conductor 40 is arranged so that it lies substantially parallel to the lines of force in the magnetic field 13. A thin magnetostrictive body 41 is also placed in the space 12 between poles 10 and 11 with its major faces parallel to the conductor 40 and with its edges respectively parallel and perpendicular to the lines of force of the magnetic field 13.

Current flowing toward pole 10 through the conductor 40, as illustrated, produces a cylindrical magnetic field around the conductor 40 of which a substantial component passes through the body 41 from right to left as viewed in Figure 4. The composite field produced by this substantial component of the cylindrical field around conductor 40 with the field 13 flowing downwardly through the body 41 extends diagonally through the body 41 in a direction generally from the upper right corner of the body 41 to the lower left corner thereof. A resulting magnetostrictive effect is produced, with a shortening of the dimension parallel to the composite field and a lengthening of the dimension perpendicular to that composite field. The body 41 tends therefore to lengthen between its upper left corner and its lower right corner, and tends to shorten between its lower left corner and its upper right corner.

The resulting skewing of the body 41 may be considered as the result of shear forces within the body 41 which tend to move its upper edge toward the left and its lower edge toward the right and which tend to move its left-hand edge upward and its right-hand edge downward, all as illustrated by the arrows at the corners of the body 41.

If the direction of current flowing through the conductor 40 be reversed, that is, so that the current flows downwardly through conductor 40, as from the north pole 10 to the south pole 11, the direction of the forces acting on the body 41 are reversed, and it skews oppositely. As explained in connection with the preceding figures, the current flowing through the conductor 40 may be reversed at a frequency equal to the natural frequency of vibration of the body 41 in the skew mode described, and the body 41 is by such excitation maintained in a sustained state of oscillation of substantial amplitude. The impedance of the structure as measured between the ends of the conductor 40 is affected by vibration of the body 41 in a manner similar to the effect which may be measured in connection with the structures of Figures 1, 2 and 3.

It has been pointed out in connection with each of the modifications so far described that the body itself must be thin so that the forces which maintain it in sustained oscillation are produced substantially in every incremental portion of the entire mass of the body. In all forms of my invention this condition assures good electromechanical coupling between the exciting circuit and the electromechanical oscillator. Electromechanical oscillators incorporating this principle, that substantially all the mass of the oscillator is acted upon by electromagnetic forces to sustain it in oscillation, may be constructed to operate at frequencies as high as may be desired, the only limit being that the vibrating body becomes difficult to manipulate at frequencies of the order of many megacycles. As pointed out previously, while only a single exciting conductor is shown by way of illustration, I contemplate in general the use of many conductors arranged like the one shown, and generally arranged in the form of a coil with suitable parts exposed to the vibrating body for its excitation.

Figure 5:
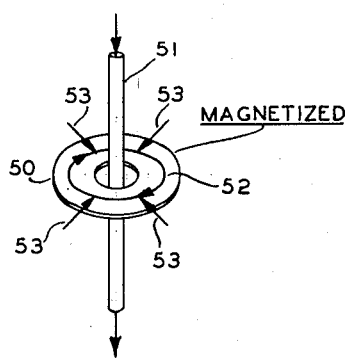

In Figure 5 an electromechanically excited oscillating body 50 surrounds, and is concentric with and lies in a plane perpendicular to, a conductor 51. The vibrating body 50, which is in the form of a washer, is formed of magnetostrictive material which is permanently magnetized in a circular direction as indicated by the arrow 52. The characteristic dimensions, to which attention was called previously in connection with Figure 1, for the vibrating body 50 may be regarded as the thickness, the distance measured between the inner and outer circumferences of the washer-shaped body 50, and the circumference of a circular portion of the body 50 taken at an intermediate radius between the inner and outer circumferences of the body 50.

When current flows through the conductor 51 downwardly, as indicated by the arrows in Figure 5, a cylindrical magnetic field surrounds the conductor 51 in a clockwise direction looking downward. This cylindrical field around the conductor 51 tends to reenforce the initial magnetization of the washer 50 and the magnetostrictive effect upon the increase in magnetic flux flowing circularly through the body 50 is to decrease that dimension of the body 50 parallel to the increased flux. That is, the circumference of the body 50 is reduced, giving the appearance that forces represented by arrows 53 pointing inwardly toward the conductor 51 are acting upon the body 50.

Upon a reversal of the current flowing through the conductor 50, the circular magnetization of the vibrating body 50 is reduced, and its circumference increases, making it appear as though forces represented by arrows 53 had reversed directions to expand the body 50.

As is the case with the systems described previously, alternation of the current flowing through the conductor 51 at the natural frequency of vibration of the body 50 in a mode such that its circumference alternately expands and contracts results in sustaining the oscillation in such mode. The impedance of the conductor 50 is desirably high at such frequency as with other forms of my invention.

The manner of operation of the structures of Figures 1 through 5 has been explained in some detail. Other forms of my invention are illustrated in subsequent figures, and their structure is described briefly hereinafter with but little explanation of their operation, which is readily perceivable by comparison of the structure with one of the structures previously described whose operation is explained in detail.

Figure 6:
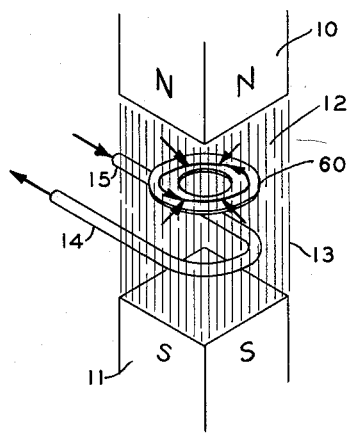

In Figure 6 a structure like that of Figure 1 is illustrated, with the difference that the vibrating body 20 of Figure 1 is replaced by a vibrating body 60 in the form of a washer made of conductive material. This structure operates in a fashion similar to that illustrated in Figure 1 except that the mode of oscillation of the washer 60 is similar to that induced magnetostrictively in the washer 50 in Figure 5. If washer 60 be made of ferromagnetic material, oscillation in the same mode may be induced by a structure like that of Figure 2.

Figure 7:
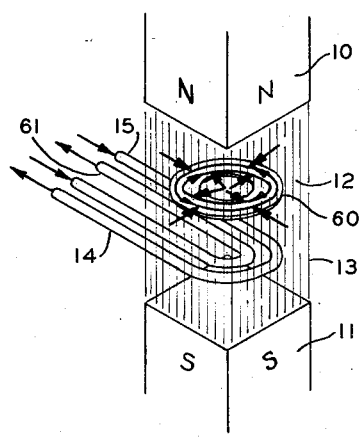

In Figure 7 a structure quite similar to that illustrated in Figure 6 is shown, except that a second looped conductor 61 is placed inside the first looped conductor 14, 15, both looped conductors lying in the same plane. Current is caused to flow through the two looped conductors in opposite directions, as illustrated by the arrows, and causes the inner part of the washer 60 to expand when the outer part contracts, and causes the inner part to contract when the outer part expands. The radial dimension of the washer 60 is therefore changed, rather than the diametrical dimension as is the case with the washer 60 in Figure 6. This mode of oscillation inherently makes washer 60 operate at a higher frequency than the mode described in connection with Figure 6.

It should be noted in connection with the vibrating body 60 of Figure 7 that the characteristic dimension which determines the frequency of vibration which is induced in the body is the distance radially between the inner and outer circumferences of the body 60. It is preferred, as in the case with the body 20 of Figure 1, to excite the washer-shaped body 60 of Figure 7 in the fashion described so that its frequency of mechanical vibration is determined by that one of its characteristic dimensions of intermediate magnitude. Excitation in a mode such that the frequency is determined by the intermediate characteristic dimension causes the body to have desirably high impedance.

Figure 8:
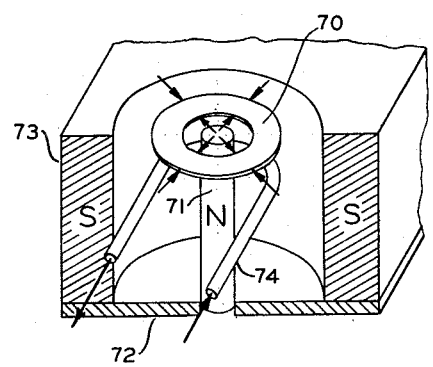

In Figure 8 there is illustrated a washer 70 in which sustained oscillations are induced by magnetostrictive action. To this end, a pole piece 71 projects centrally through the washer 70, and is in a magnetic circuit including serially a yoke 72 and a second pole piece 73 surrounding the body 70. The pole pieces 71 and 73 maintain a fixed magnetic field radially through all parts of the body 70. A looped conductor 74 is placed near the body 70 and lies in a plane parallel to the plane of the body 70, so that the cylindrical field surrounding each portion of the conductor 74 when it carries current has a substantial component passing radially through the body 70.

The fixed field through the body 70 combined with the alternating field induced in the body 70 by current going through the conductor 74 forms a composite field which produces a magnetostrictive effect in the body 70 so that it oscillates in a fashion similar to the mode of oscillation of the washer 60 of Figure 7.

In Figure 9 a washer 80 of magnetostrictive material is permanently magnetized in a circular direction and placed in a plane parallel to the plane in which a looped conductor 81 lies. As with the structure illustrated in Figure 8, current flowing through the looped conductor 81 produces an alternating field radially through the body 80, and this alternating radial field acts with the permanent circular field in each section taken circularly around the body 80 in a manner similar to the action of the two fields described in the structure of Figure 4. There results a shear mode of oscillation in which the outer circumference of the magnetostrictive body 80 tends to rotate in one direction while the inner part of the body 80 tends to rotate in the opposite direction, as indicated by the arrows on the body 80 in Figure 9.

While it might be thought, from a consideration of the fact that the arrows on the body 80 of Figure 9 indicate shearing forces which produce circumferential motion of material in the body 80, that its natural frequency of vibration is determined by its circumferential dimension, actually the natural frequency of vibration of the body 80 is determined by the radial distance between the inner and outer circumferences of the body, in the same manner as that characteristic dimension determines the natural frequency of vibration of the body 60 of Figure 7. Since the modulus of elasticity in shear for the body 80 is different from the modulus of elasticity in compression for the body 60 of Figure 7, the actual frequencies of vibration of these two bodies are widely different, even though their actual characteristic dimensions are identical.

In Figure 10 the washer 87, instead of being permanently magnetized, is placed in a fixed magnetic field between pole pieces 82 and 83, disposed on opposite sides of the body 87. Flux passes from pole piece 82 in parallel paths through the opposite sides of the body 87 and into the pole piece 83. Reaction of this flux with flux induced in the body 87 by current flowing in the looped conductor 81 causes a magnetostrictive effect in each of the opposite halves of the body 87 similar to that caused in the body 80 in the structure of Figure 9, except that the shear action in the opposite halves of the body 87 is oppositely directed. That is, the inner portion of one-half of the body 87 tends to rotate in one direction while the outer portion of that half tends to rotate in the opposite direction, but the inner portion of the opposite half of the body 87 tends to rotate oppositely to the inner portion of the first half, while the outer portion of such opposite half of the body 87 tends to rotate oppositely both to the inner portion of that opposite half and to the outer portion of the first half of the body 87. This type of shear oscillation may be termed a double shear mode, in which tensile and compressive forces are produced in the body 87 along a line parallel to the field between pole pieces 82 and 83 and substantially bisecting the body 87.

The mode of oscillation experienced by the body 87 in the structure of Figure 10 is inherently of a somewhat higher frequency for the same sized body as the mode of oscillation experienced by the body 80 in the structure of Figure 9. The two opposite side portions of the body 87 of Figure 10 vibrate in substantially pure shear oscillation, but portions of the body 87 nearest the poles 82 and 83 vibrate substantially in a compressional mode. Since the compressional force acts between the shearing forces in opposite halves of the body, and in effect couples these oppositely acting shearing forces in the two halves of the body 87, the frequency of the shearing vibration in this mode is somewhat higher than where the same body vibrates in pure shear, as in the case of the body 80 in Figure 9. That is, if the washer-shaped bodies 80 and 87 of Figures 9 and 10 be otherwise identical, the difference in the frequency of vibration may be considered as the result of operating the two vibrating bodies in the two different modes of oscillation possible with a system which has two resonant portions coupled together. One mode of oscillation exists where the two resonant portions are coupled so as to oscillate in phase as one resonant structure, while the other mode of oscillation takes place where the two resonant parts oscillate out of phase at a higher frequency.

In Figure 11 there is illustrated a structure which is in most respects identical with that illustrated in Figure 10, the only difference being that the center hole 84 of a body 88, similar otherwise to body 87 of Figure 10, is extended at points 85 and 86 in the direction of the field between pole pieces 82 and 83. It has been found that removal of the material to form the notches 85 anad 86 in the central hole 85 of the body 88 is effective to cause the entire mass of the body 88 to be excited somewhat more efficiently than is the case with the structure of Figure 10. That is, excitation is supplied substantially more nearly to the entire mass of the body 88 as shaped in the structure of Figure 11 than as in the structure of Figure 10. The body 88 with the notches 85 and 86 is capable of substantially higher frequency vibration than without the notches, provided the notches are so shaped as to remove substantial mass from the body 88.

If the notches 85 and 86 be so shaped as to remove substantially no mass from the body 88, as for example by making these notches in the shape of very narrow slots, it is found that the frequency of vibration of the body 88 is lower after the slot has been formed. This effect is produced because the compressional forces between the two halves of the body vibrating in the shear are reduced, reducing the ratio of vibrating force in the body to its mass. This phenomenon may be found useful in adjusting the operating frequency of such a vibrator during its manufacture.

In Figure 12 a thin piece of conducting material 90, shaped in the form of a capital H, is placed in and with its major surfaces perpendicular to a magnetic field 91 between pole pieces 92 and 93. Near a face of one arm 94 of the H-shaped piece 90 there is placed an exciting coil 95 in the same relation to the arm 94 as is the looped conductor 14, 15 to the body 20 in Figure 1. Similarly, a second coil 96 is placed in exciting relation with the other arm 97 of the body 90.

When the coil 95 is excited with current of suitable frequency, oscillations are induced in the arm 94 of the H-shaped body 90, and, by mechanical coupling, the other arm 97 of the body 90 is caused to vibrate and induce a corresponding alternating voltage in the coil 96 which is electrodynamically related to it. The frequency of the induced oscillations in the arm 94 is determined by that characteristic dimension of the body 90 which is the width of the arm 94 between the arrows shown in Figure 12. It is assumed, of course, that the arm 97 is of substantially the same width as the arm 94, and that the connecting portion between the two arms is approximately the same width also.

This arrangement is particularly suitable for use as a filter in which a wave impressed across one of the coils 95 and 96 appears in substantial intensity in the other coil only if the frequency of the wave is near the natural frequency of vibration of the body 90. When the body 90 is formed of aluminum, the signal transferred between the two coils at the resonant frequency of the body 90 is of the order of 20 to 25 decibels greater than when the signal is of substantially different frequency. The quality factor of the filter formed by the structure is of the order of 10,000. That is, the band width at one megacycle is of the order of 100 cycles.

In Figure 13 a somewhat different form of filter is illustrated in which the coils 95 and 96 are electromechanically coupled to the opposite sides of a washer 100. Each of the coils 95 and 96 produces, in the washer 100 to which it is coupled, oscillations like those induced in the washer 60 of Figure 7 by the double looped conductor illustrated there.

In Figure 14 a thin walled cylinder 110 of magnetostrictive material is placed concentrically around a conductor 111. The cylinder 110 is cylindrically permanently magnetized.

Reaction between currents flowing in the conductor 111 and the permanently magnetized cylinder 110 is similar to the reaction between the washer 50 and current flowing in the conductor 51 of Figure 5. Vibration of the cylinder at its natural frequency by alternate radial expansion and contraction is produced, and an increase of impedance at such natural frequency occurs between the ends of conductor 111.

The three characteristic dimensions of the thin walled cylinder or tube of Figure 14 are its length, the thickness of its wall, and the circumference of a circular portion of the cylinder at a radius intermediate its inner and outer circumferences. This last circumference is the characteristic dimension which determines its natural frequency of vibration in the mode of oscillation induced by the structure of Figure 14, and it should be noted that it is of magnitude intermediate the magnitudes of the other two characteristic dimensions.

It is notable that efficient excitation of the cylinder 110 is possible because it is made thin walled, whereby substantially every incremental portion of its entire mass is acted upon by the magnetostrictive reaction between the oscillating field around conductor 111 and the permanent magnetization in the cylinder 110.

The conductor 111, which extends centrally through the cylinder 110, is bent back and a part 112 is placed parallel and close to the outside of the cylinder 110, so that the cylindrical field surrounding the part 112 of the conductor 111 reenforces the cylindrical field surrounding the conductor 111, so that even more efficient operation is attained. That is, when current flows through the conductor 111 in the direction indicated by the arrows, flux exists around the conductor 111 within the cylinder 110 in the direction of the circular arrow marked on the end of the cylinder 110. Also current flowing in the direction indicated by the arrows through the part 112 of the conductor 110 is accompanied by a flux around the part 112 in such direction that flux induced within that part of the cylinder 110 between the two legs of the conductor 111 is in reinforcing relationship. Still better efficiency may be attained by providing, instead of the part 112 of the conductor 111 for returning the current close to the outside of the cylinder 110, a conducting cylinder larger than the cylinder 110 and placed concentrically with it and outside of it. The current then flows through the cylinder 110 along conductor 111 and in the opposite direction back around the cylinder 110 through the added conductive cylinder which replaces the part 112 of conductor 111.

In Figure 15 there is illustrated an electrical circuit, inside dotted rectangle 126, which circuit is electrically equivalent to any of the structures illustrated in Figures 1 through 14 excited by a single coil or conductor. The mechanically vibrating body appears electrically to the single exciting coil or conductor as a parallel tuned circuit including an inductance 120 and a condenser 121. Due to internal mechanical damping within the mechanically vibrating body, there is some power loss in the body itself, and such loss is represented in the tuned circuit 120 and 121 by a resistance 122 connected in shunt to the inductance 120 and to the condenser 121. The coupling or exciting coil or conductor has inductance and loss resistance which, measured when the coil is in the presence of the vibrating body at frequencies in the general range of but not near the natural frequency of vibration of the vibrating body, are represented respectively by an inductance 123 and a resistance 124 connected in series with the tuned circuit 120, 121 and 122. The impedance represented by inductance 120, resistance 122 and conductor 121 connected in parallel with one another is termed the "reflected motional impedance" of each one of the vibratory systems. It is this reflected motional impedance which, in the case of a filter circuit, produces sharp cutoff characteristics and in the case of oscillators causes the oscillator connected thereto to be highly stabilized. This reflected motional impedance expresses itself physically by electromagnetic reaction between current flowing in the body, poles formed on the body, or in the case of magnetostrictive devices by change in magnetization. That is, the electrical circuit constants 120, 121 and 122 are manifested only when the body vibrates and represents only that contribution due to vibration of the body. It is, of course, desirable to make the magnitude of resistance 122 as large as possible in comparison to the magnitude of resistance 124 and for that reason as shown in each one of the modifications herein the vibratory body is vibrated in a mode determined by an intermediate dimension.

The schematic diagram of Figure 15 illustrates a circuit inside rectangle 126 which is the electrical equivalent of any form of the invention shown in the preceding figures in which one exciting coil is used including Figure 2 when coil 18 and the coil comprising legs 14, 15 are considered as one coil. By way of example, for one particular embodiment of the invention shown in Figures 11 and 23 wherein the modified washer-shaped vibrator had an outside diameter of .267 inch, inner diameter of .25 inch, a thickness of .010 inch and the edges defining the cut-out portions were tangent to the inner circular edge. In such an arrangement the velocity of wave propagation in the vibrator when vibrating in shear was such that the vibrator was suitable for operation at one megacycle, the elements of the equivalent circuit shown in Figure 15 being substantially as follows: The inductance 120 is 700 micro-microhenrys and the capacity 121 is 37 micromicrofarads. The resistance 122 is 60 ohms. The inductance 123 is 25 microhenrys and the resistance 124 is 60 ohms.

All forms of the invention correspond to an equivalent circuit in which the relative magnitudes of the elements are much the same as those described. In such an arrangement the reactance is predominantly inductive throughout the entire range of frequencies and departs substantially from the inductance which would be expected if the vibrating body did not vibrate only at frequencies near the frequency at which the inductance 120 and condenser 121 are resonant, that is, at frequencies at which the body vibrates with substantial intensity. Since the internal damping of the mechanical vibrator represented by resistance 122 is relatively small, the band of frequencies within which the inductance 120 and capacity 121 affect the reactance of the device is relatively small. As frequency increases through this relatively small band of frequencies, the reactance of the device first increases more rapidly than is to be expected for a system in which the vibrating body does not vibrate, and reaches a maximum below the frequency at which the capacity 121 resonates with the inductance 120. Thereafter, the reactance decreases rapidly, becoming lower than is to be expected for a system in which the vibrating body does not vibrate, until it reaches a minimum which may be still inductively reactive or which may even be capacitively reactive. At this minimum point, the combination of inductance 120 and capacity 121 appears capacitive. If the capacitive reactance of this combination of inductance 120 and capacity 121 were sufficient, it would resonate in series with the inductance 123. The capacitive reactance of the combination is not usually, however, sufficient to produce such series resonance, but is usually only sufficient to cause a minimum inductive reactance of the device at a frequency near which the device would otherwise be series resonant. As the frequency increases still further the reactance increases from this minimum and approaches the reactance of a system in which the vibrating body does not vibrate.

In order to make the device most easily usable, I prefer to utilize the parallel resonance of the inductance 120 and capacity 121 in the absence of effect from the inductance 123. To that end, I provide a coupling condenser 125 whose capacitive reactance is just sufficient to resonate with the inductance 123 at the resonant frequency of the inductance 120 and capacity 121. When the various elements of the device are of the magnitude previously described, by way of example, the capacity 125 is about 1,000 micro-microfarads. With such an arrangement including the condenser 125, I am able to utilize the property of a device embodying my invention of having a maximum impedance at a certain frequency and of having a much lower impedance at frequencies only slightly above or below the frequency at which maximum impedance occurs.

In Figure 16 an arrangement for utilizing a device constructed in accordance with my invention in such fashion is illustrated. An oscillator including an electron discharge device 130 is arranged together with a device constructed in accordance with my invention, and represented schematically by inductance 131, capacity 132, and inductance 133, so that the combination only oscillates very nearly at the frequency at which the inductance 131 and capacity 132 have maximum impedance. For the sake of simplicity I have omitted illustration of resistances 122 and 124, and it is further to be remembered that the inductance 131, condenser 132 and inductance 133 are elements forming a circuit which is only the electrical equivalent of a device embodying my invention. The device represented by elements 131, 132 and 133 is coupled to a coupling coil 134 through a coupling condenser 135. The coupling coil 134 is inductively coupled to an inductance coil 136 which is connected between the positive terminal of a source 137 of operating potential for the device 130 and the anode 138 of the device 130. The cathode 139 of the device 130 is connected to the negative terminal of source 137 and to ground. A tuning condenser 140 is connected in shunt to the inductance 136 and is resonant with the inductance 136 at approximately the same frequency at which the device of my invention exhibits maximum impedance. That is, the inductance 136 and capacity 140 are resonant at about the same frequency as that at which the inductance 131 is resonant with the capacity 132.

A grid resistance 141 is connected between the cathode 139 and control electrode 142 of discharge device 130. A third coupling inductance 143, which is inductively coupled to the inductances 136 and 134, is connected at one end to the cathode 139 and at the other end through a coupling condenser 144 to the control electrode 142 of discharge device 130.

Any voltage variation of the anode 138 with respect to the cathode 139, caused by a current change in the inductance 136, causes a corresponding voltage change across the coil 143, which is so poled as to cause a voltage change on the control electrode 142 in such sense as to cause a further change in the same direction in the discharge current flowing between the anode 138 and cathode 139, and correspondingly in the voltage therebetween, in the device 130. Such is the necessary condition for sustained oscillation of a circuit connected with an electron discharge device. If the device of my invention were not coupled to the tuned circuit 136, 140, that tuned circuit would determine the frequency at which such sustained oscillation takes place. With the device of my invention coupled with the tuned circuit 136, 140, the overall impedance characteristic of the entire system is altered so that sustained oscillation takes place at a frequency very near that of the resonant circuit 131, 132, in which resonant circuit the least damping is present.

Expressed in another manner, the tuned circuit 136, 140, being relatively highly damped, has a phase shift which varies relatively slowly as frequency changes. Similarly, the series resonant circuit formed by the coupling condenser 135 with the inductances 134 and 133, is also relatively highly damped, and has a relatively slowly varying phase shift upon frequency change. On the other hand, the phase shift of the tuned circuit 131, 132 upon frequency change is extremely rapid, with the result that the reactance introduced into the network by the tuned circuit 131, 132 upon very slight changes in frequency is sufficient to reduce the tendency to oscillate at such slightly different frequencies and so forces oscillation to be maintained only at a frequency determined substantially entirely by the tuned circuit 131, 132. In order to make it possible for the resonant circuit 131, 132 to exert a strong stabilizing influence on the associated oscillating circuit, it is essential that the following condition be met, i. e., that a relatively large reactive current flows through coil 134 when the frequency of oscillation tends to deviate from a predetermined frequency, but that very little current flows through coil 134 at such predetermined frequency. Referring back to Figure 15 wherein the circuit constants of Figure 16 are more completely shown and in which the last resistance 124 and the resistive part 122 of the reflected motional impedance are represented, it is apparent that such condition for current flow is met best when resistance 122 is large in comparison to resistance 124.

It has been found that for a given vibratory body and mode of vibration the resistances 122 and 124 increase with the number of turns in the exciting or coupling coil in about the same proportion and hence merely increasing the number of turns on such coil will not itself improve stabilization. According to this invention, a satisfactory ratio of these resistances 122 and 124 is obtained by increasing a dimension of the vibratory body which is substantially perpendicular to that dimension which determines the mode and frequency of vibration. Practical embodiments of the present invention are obtained if such dimension perpendicular to the frequency determining dimension is increased to such a point that its magnitude is substantially larger than the frequency determining dimension. For example, in the embodiment found in Figure 8, the frequency of vibration is determined by the radial width of the body 70 and the circumferential length of the body which represents a dimension perpendicular to that of radial width may be ten or more times larger than the radial width.

It has been known that the "skin effect" noticeable at high frequencies prevents penetration of electromagnetic energy into a body of appreciable thickness. Therefore, in accordance with this invention the vibratory body is so shaped that it has three dimensions of substantially different magnitude—the shortest dimension allowing excitation of substantially all incremental portions of the body, the largest dimension providing a large amount of useful reflected motional impedance—and a structure is associated with such vibratory body such that there is provided excitation in the body in a mode and frequency determined by its intermediate dimension. It is noted that in all of the arrangements shown herein the exciting coil and associated magnetic structure is arranged such, in relationship to the vibratory body, that substantially all incremental portions of such body are vibrated in a mode and frequency determined by its smallest or thickness dimension.

In Figure 17 a different form of oscillator is illustrated in which a device constructed according to my invention is utilized, which device has two exciting coils 150 and 151, or somewhat more properly speaking, two coupling coils coupled to the same vibratory member 152. Such devices are illustrated in Figures 12 and 13 in which two coupling coils are used with a single vibrating member, each coupling coil being arranged so that it may be used to excite the vibrating member by the reaction between currents induced in the vibrating member from the coupling coil and a fixed magnetic field. Voltages are induced in the other coupling coil from the vibrating member as it moves in the fixed field.

The vibrating body 152 shown in Figure 17 is illustrated as in the form of a washer. Dotted line 153 between coils 150 and 151 indicates that magnetic linkage directly between the coils 150 and 151 is minimized as far as possible. In this form of oscillator, a tuned amplifier is connected between the inductances 150 and 151, the input of the amplifier being connected to one inductance and the output to the other, whereby the attenuation between coils 150 and 151 is least at the frequency at which oscillation is desired, so that sustained oscillation can take place only at the one desired frequency.

The tuned amplifier includes an electron discharge device 154 with a parallel resonant circuit including inductance 155 and capacity 156 connected between the anode 157 of the discharge device 154 and the positive terminal of a source 158 of operating potential for the device 154. The cathode 159 of device 154 is connected to the negative terminal of source 158 and to ground. A grid resistance 160 is connected between cathode 159 and control electrode 161 of device 154, and a tuned circuit including inductance 162 and capacity 163 is coupled across the grid resistance 160 through a coupling condenser 164.

The output tuned circuit 155, 156 of the amplifier 154 is inductively coupled to an inductance coil 165 which is connected through a coupling condenser 166 across the coupling coil 151 associated with the vibrating body 152. Similarly, the input tuned circut 162, 163 of the amplifier 154 is inductively coupled to a coupling inductance 167, which is connected through capacity 168 across the coupling coil 150, which is also associated with vibrating body 152.

In order to minimize interaction between the output tuned circuit 155, 156 and the input tuned circuit 162, 163 by reason of capacitive coupling between the anode 157 and control electrode 161 of discharge device 154, a screen electrode 169 is interposed between the anode 157 and control electrode 161. This screen electrode 169 is maintained at a positive potential with respect to cathode 159 by connection through a resistance 170 to the positive terminal of source 158 and is maintained at a constant potential by connection through a condenser 171 to the cathode 159.

Operation of the oscillator illustrated in Figure 17 may be better understood by reference to Figure 18 in which there is illustrated in dotted rectangle 189 a circuit which is the electrical equivalent of the device shown diagrammatically in Figure 17 by the coupling inductances 150 and 151 and the vibrating body 152. The mechanically resonant body 152 is represented in Figure 18 by a resonant circuit including inductance 180 and condenser 181, and, since there is internal damping in the body, the damping is represented by a resistance 182 connected in shunt to the inductance 180 and condenser 181. The reactance which appears electrically between the terminals of coil 150 when body 152 is not vibrating is represented by the inductance 183 and the resistance therebetween by resistance 184. A condenser 185 is provided in series with the coil 150 and is of such magnitude as to resonate with the inductance 183 at the resonant frequency of the circuit including inductance 180 and condenser 181. This coupling condenser 185 serves the same purpose as the condenser 125 provided in Figure 15.

The elements thus far described are identical with those illustrated in Figure 15 and function in like manner. When two coupling coils are provided, the effect of the second coupling coil 151 electrically appears in Figure 18 as an inductance 186 and a resistance 187 connected in series with each other and with the resonant circuit 180 and 181. A condenser 188 is connected in series with the coil 151 for the same purpose as the condenser 185.

Inspection of circuit of Figure 18 indicates that it operates by transmitting energy through coupling condenser 185 to the tuned circuit 180, 181 and then through the coupling condenser 188, such transmission being possible only when the impedance of the tuned circuit 180, 181 is substantial. That is, there is no substantial transfer of energy from coupling condenser 185 to coupling condenser 188 at frequencies at which the tuned circuit 180, 181 is not resonant, and there is substantial transfer of energy at the resonant frequency of that circuit.

In Figure 19 there is illustrated a resistance network which is equivalent to the circuit of Figure 18 at the resonant frequency of the circuit 180, 181. Resistances 184 and 187 appear serially between the input and output of the network, and resistance 182 appears in shunt to the signal path between resistances 184 and 187. This resistance 182 is the effective resistance of the tuned circuit 180, 181 at its resonant frequency. With this resistance in shunt to the signal path, it is evident that signals are readily transferred through the network.

In Figure 20 there is illustrated a network which is equivalent to the equivalent circuit of Figure 18 at frequencies other than the frequency at which the circuit 180, 181 is resonant. At such other frequencies, the impedance of the circuit 180, 181 is vanishingly small, so that the resistances 184 and 187 appear to be connected respectively across the input and the output of the network, with the result that substantially no signal is transferred between the input and the output of the network.

Such analysis of the operation of the mechanical vibrator 152, together with the coupling coils 150 and 151 of Figure 17, makes it quite evident that attenuation is extremely great between the coupling coils 150 and 151 except at the resonant frequency of the vibrator 152. It is only at that frequency at which attenuation is least that the tuned amplifier including discharge device 154 maintains sustained oscillation.

The tuned circuits 155, 156 and 162, 163 of the amplifier are, of course, resonant approximately at the frequency of the vibrating body 152, and the coupling condensers 166 and 168 are made of such size that the coupling circuits in which they are connected are also resonant at about the same frequency.

In Figures 21 to 25 there are illustrated various parts of a preferred embodiment of my invention. In Figure 21 a casing 200 of insulating material is provided with a standard vacuum tube base 201 and encloses and supports a metal mounting plate 202. On one side of the base plate 202 within the container 200 there is mounted a structure arranged to produce a fixed magnetic field and to support in that fixed field a mechanical vibrator constructed according to my invention and coupled to two coupling coils. This structure includes two L-shaped pole pieces 203 and 204, of which the short arms face each other lying in the same plane and are terminated in arcuate portions 205 and 206, respectively, between which circular pieces may be inserted. Between the long parallel portions of the L-shaped pole pieces 203 and 204 a magnet 207 is placed. This magnet 207 is preferably made of magnetic material capable of retaining a large amount of magnetic energy per unit volume and is so magnetized as to maintain magnetic flux between the arcuate portions 205 and 206 of the pole pieces 203 and 204.

In Figure 22 there is shown an assembly view of a mechanically vibratory body 210 and a pair of coupling coils 211 and 212 arranged to be held between the arcuate portions 205 and 206 of pole pieces 203 and 204. The vibratory body 210 is of the type which is excited by magnetostriction, and is similar to that illustrated in Figure 11 in its shape and in its mode of oscillation. The vibratory body 210 is held in place between the pole pieces 203 and 204 by being laid around a shoulder 213 formed centrally on a double screw-ended stud 214. Above the vibratory body 210 and the shoulder 213, which is sufficiently thicker than the body 210 to allow it clearance within which to vibrate, there is stacked consecutively a thin washer of hard insulating material 215, coil 211, a washer 216 of hard insulating material with a suitable space cut away for the coil 211, a third washer 217 of insulating material, a spring lock washer 218, and a nut 219 tightened down on the screw-threaded end of the stud 214. Below the shoulder 213 there is stacked a thin washer 220 of hard insulating material, coil 212, a second washer 221 similar to the washer 216, a third washer 222 similar to the washer 217, and a lock washer 223 and nut 224 similar to the washer 218 and nut 219.

A hole 225 is drilled through the washer 216 from the opening in which coil 211 is placed, and a channel 226 is formed along the lower surface of the washer 217 from the hole 225 to the outer circumference of the washer 217, and through this hole and channel the two connecting wires for the coil 211 are brought out where connection may be made to them. Similarly, a hole 227 is drilled through the washer 206 from the space within which the coil 212 is placed and a channel 228 is formed along the surface of the washer 222 leading from the hole 227 to the outside of the assembly so that the connecting wires from the coil 212 may be brought through the hole 227 and channel 228 to the outside.

In operation, excitation of one of the coils 211 or 212 excites the washer-shaped vibratory body 210 in the same manner as explained in connection with the devices of Figures 10 and 11. Vibration of the body 210 in the fixed magnetic field between the pole pieces 203 and 204 induces voltages in the other coil of the pair of coupling coils 211 and 212.

Shielding is provided between the coils 211 and 212 by the vibratory body 210 itself as well as by the shoulder 213 formed on the stud 214, and to some extent by the the pole pieces 203 and 204. In order to make this shielding more nearly perfect, a copper washer 230 is assembled with the parts described in the preceding paragraph and just fits around the thin washer 215.

A washer 231 of yieldable material is placed between the washer 230 and the washer 216 so as to fill up the space therebetween and seal the space within which the coil 211 is placed, at the same time allowing for manufacturing inaccuracies in the assembly of the whole.

In Figure 23 the parts with the exception of coils 211 and 212 which are shown assembled in Figure 22 are illustrated in an exploded view, and the same parts are given like reference characters. The method of assembly of the structure shown in Figure 22 is readily seen in this exploded view.

It is particularly notable that the shape of the shoulder 213 on the stud 214 is such that it fits within the notches 232 and 233 on opposite sides of the hole centrally through the vibratory body 210. As was explained previously, the removal of some material of the vibratory body 210 so as to leave notches 232 and 233 is effective to increase the frequency of operation of the body 210 without decreasing its diameter. At the same time, these notches 232 and 233 serve another important purpose in that they provide that the body 210 shall remain not only located centrally with respect to the stud 214 but also so that it cannot turn around that stud.

It is important to prevent the washer 210 from rotating with respect to the magnet pole pieces 203 and 204 for a number of reasons. It is possible for a body of the shape of the washer 210 to vibrate only in two directions in a flat dimension, and these directions are primarily determined by the direction in which the metal was originally worked into shape. One of these possible directions is the direction in which the metal was so worked and the other the direction normal to that first direction. The natural frequencies of vibration of the body 210 in the two different directions are substantially different. If the body 210 were allowed to rotate, it would oscillate mechanically first at one frequency and then at the other, corresponding to the two different moduli of elasticity in the two directions, one with the grain of the metal in the direction it was originally worked and the other across that grain.

Furthermore, if the washer 210 should rotate, its orientation with respect to the field between the pole pieces 203 and 204 changes, which simultaneously affects the natural frequency of vibration of the washer 210 and changes the reaction between the coupling coils 211 and 212 and the washer 210. It is therefore very desirable to prevent the washer 210 from rotating with respect to the pole pieces 203 and 204.

Most devices capable of operating at a constant frequency are most desirably so constructed that temperature changes have little or no influence upon their frequency of operation. It is evident from the equivalent circuits shown in Figures 15 and 18 that constant frequency operation of devices constructed according to my invention is dependent substantially in its entirety upon the constancy of the frequency at which the circuits, including inductance 120 and condenser 121 in Figure 15 or inductance 180 and condenser 181 in Figure 18, oscillate. This means that the constancy of frequency of a device constructed in accordance with my invention is dependent substantially only on the constancy of the frequency of mechanical vibration of the vibratory body itself.

The frequency of mechanical vibration of a body is dependent primarily upon its density and dimensions and upon Young's modulus of the material of which it is constructed. Any material is suitable for making vibrators according to my invention whose natural frequency of vibration does not change upon change in temperature. Such materials are those in which the dimensions and the Young's modulus do not change upon change in temperature, or those in which any change in dimensions upon change in temperature is counteracted in its effect upon the operating frequency by an equal and opposite effect produced by change in the Young's modulus upon change in temperature.

The material known as Invar, consisting of 63.8% iron, 36% nickel, and 0.2% carbon, is not desirable for use in constructing a vibratory body according to my invention for most purposes. While the dimensions of this material change very little upon changes in temperature, the Young's modulus changes in very great degree. Consequently, a vibratory body formed of this material changes its operating frequency greatly upon changes in temperature.

Materials are known of which it is said that the elasticity is invariable with temperature and these materials are in general suitable for the construction of vibratory bodies according to my invention. An example of one alloy composition, which has magnetostrictive properties, and which is suitable is one formed of 34 to 38% nickel, 8 to 12% chromium, and the remainder iron. Such a material has a natural frequency of vibration which is substantially independent of temperature changes. A piece of it does not substantially change its dimensions or its Young's modulus upon change in temperature. It is evident, from the fact that its operating frequency does not change upon change in temperature, that any slight change in dimension is substantially compensated by a compensatory change in the Young's modulus.

These alloys whose mechanical vibrating frequency does not change substantially upon changes in temperature may be obtained in sheet form and, after having been shaped appropriately in accordance with my invention to produce a vibrating body of desired shape and of suitable size to produce a desired operating frequency, must be treated in suitable fashion to have most desirable operating characteristics. The sheets in which these alloys are available are in general cold rolled, and have an undesirably large internal damping, represented by resistance 122 in Figure 15. They also have sometimes been found to have a coefficient of frequency change upon temperature change which is substantially zero around normal room temperatures, but which is negative at higher temperatures such as may be conveniently maintained constant by means of a thermostat and heater. I have determined that annealing is very desirable in the construction of a vibratory body according to my invention in order to reduce such high internal damping to a satisfactorily low value. At the same time for certain forms of my invention, such annealing may be made to raise to a suitable degree above room temperatures the temperature at which the coefficient of frequency change upon temperature change is substantially zero.

In annealing, for example, one of the vibratory elements of my invention of the type described in Figure 4, its operating frequency is raised to a slight extent so that it must be initially shaped before annealing so that its operating frequency after annealing is very near the finally desired operating frequency. This is necessary because I have found that the first annealing of one of the vibratory bodies of my invention is effective to reduce the internal damping to a desirably low value, but that, if it is necessary to reanneal the body, the internal damping cannot always be reduced to such a desirably low value again.

The annealing procedure is as follows. The vibratory body, suitably shaped to operate at a frequency just enough lower than its finally desired frequency so that after annealing it will operate very near the desired frequency, is raised to a temperature in the order of 450° centigrade for a time in the order of one to thirty minutes. This is the maximum temperature to which the body is subjected and that maximum temperature substantially determines the temperature at which the resulting vibratory element has a zero coefficient of frequency change upon temperature change. The maximum annealing temperatures which I have used are designed to cause the temperature at which this zero coefficient results to be about 55° centigrade. Such a temperature of the vibrating body may conveniently be maintained constant by a thermostat and electric heater.

After such initial annealing at the maximum temperature, the frequency is checked and should be slightly lower than the finally desired frequency. A suitable minute amount of the material of the vibrating element is removed to raise the frequency to the final desired operating frequency. Thereafter, the body is further annealed at a lower temperature, which is sufficiently high that the internal damping of the body, after heating for a time in the order of a half hour, is desirably reduced.

The second part of the annealing process is desirable not only because it reduces damping but also because it substantially eliminates any change of operating frequency and internal damping of the body upon ageing, provided the final stage of annealing is of sufficiently long duration.

Care must be taken during every stage of the manufacture of the vibratory element to avoid subjecting it to unnecessary stress, which results in undesirable characteristics of the finished body. It is particularly important after the first part of the annealing process and when the minute amount of material is removed from the element to avoid subjecting it to any appreciable stress in order that the internal damping of the finished vibrating element shall be low.

This annealing process for adjusting the frequency coefficient of temperature is applicable to any vibrating system which operates in a manner analogous to that of Figure 4. There are systems, such as that of Figure 3, in which annealing has little effect on the frequency coefficient of temperature.

Figure 24:
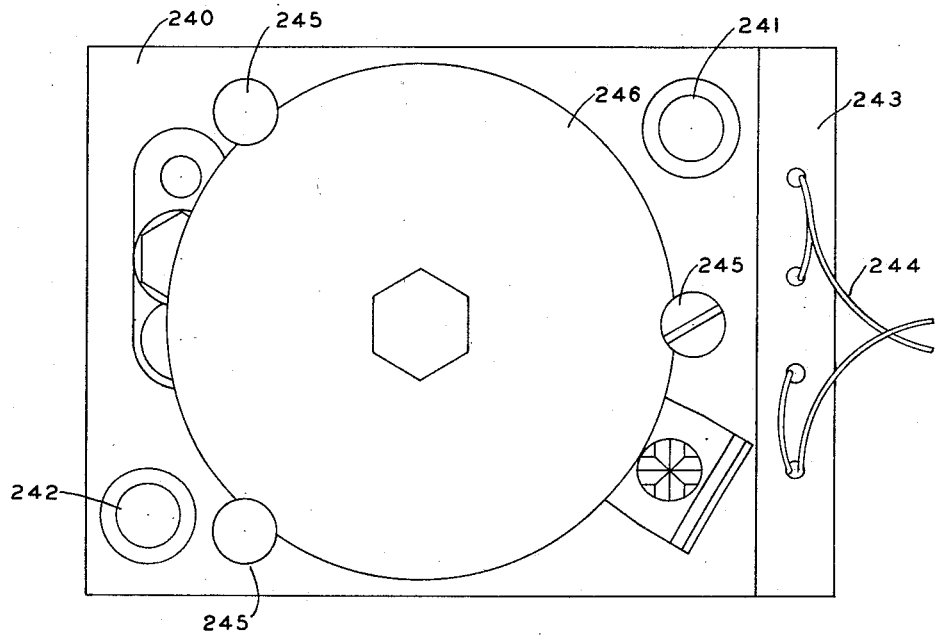

As has been pointed out, in the preferred form of my invention, in which the vibrating body has been annealed so that it has desirably low internal damping and a zero frequency temperature coefficient at an elevated temperature, it is desirable to provide a thermostat and heater to maintain the vibrating body and its coupling coils at such elevated temperature. To this end, the structure illustrated in Figure 21 is provided with such a heater and thermostat as illustrated in Figure 24. This heater and thermostat structure of Figure 24 is arranged so that it may conveniently be attached to the back of the supporting plate 202 illustrated in Figure 21. This supporting plate 202 is preferably of heat conducting material, and the casing 200 is closed, so that the thermostat and heater upon being energized may quickly raise the entire inside of the casing to a constant elevated temperature.

In Figure 24 the thermostat supporting plate 240 is provided with holes 241 and 242 through which the plate 240 and the attached thermostat and heater may be attached to the back of the supporting plate 202 of Figure 21. A heater including a heat resisting insulating sheet 243, through which a resistance wire 244 is threaded is attached to the back of the plate 240 so that it lies between plate 240 and the supporting plate 202 of Figure 21.

Three posts 245, extending outwardly from the plate 240, support a circular snap-acting thermostat disk 246 at three points around its circumference, so that contacts actuated by movement of its central portion are opened as its temperature rises, and are closed as its temperature drops below the predetermined temperature for which the vibrating body is annealed to have a zero coefficient of frequency change upon temperature change.

Figure 25:
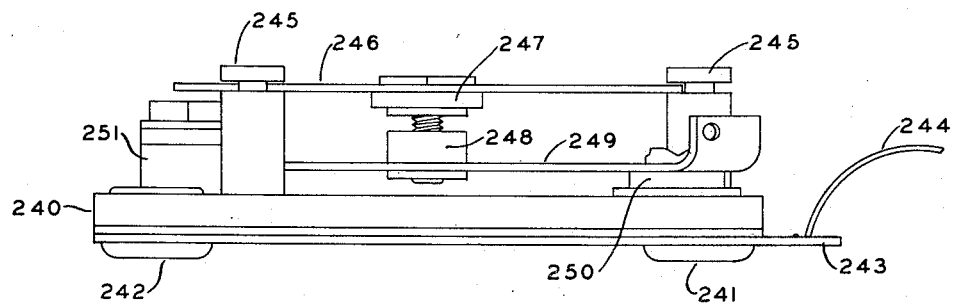

In Figure 25 there is shown a side view of the thermostat and heater structure of Figure 24, and identical elements are given like reference characters. In this edge view, one contact 247 is illustrated centrally affixed to the circular thermostat disk 246, and the other contact 248 is illustrated as being attached to a conducting supporting member 249 which is supported on the plate 240 by insulating supports 250 and 251.

An operating circuit is formed through the heater, thermostat and a terminal pin of the base 201 (Figure 21) by connecting one end of the resistance wire 244 to an appropriate pin of the base 201 and the other end of the resistance wire 244 to the conducting member 249. The contact 247, being electrically in connection with the thermostat disk 246, and plates 240 and 202, is connected to another pin of the base 201 by a suitable connection from that pin to the plate 240. Suitable means is provided to adjust the spacing at a predetermined temperature between the contacts 247 and 248, whereby the temperature which is maintained by the thermostat and heater may be adjusted to any desired value. As explained previously, the adjustment of this temperature is such that the temperature maintained within the casing 200 is that for which the coefficient of frequency change upon temperature change of the vibrating body is substantially zero.

In Figure 26 there is illustrated in rectangle 260 the equivalent circuit for a vibrating body and coupling coils such as that shown in Figure 22, in which undesired coupling directly between two coupling coils coupled to the same vibrating body is represented by an inductance 261 and resistance 262. This equivalent circuit is similar to that illustrated in Figure 18, and identical elements are given like reference characters.

In Figure 27 there is illustrated the actual circuit connection of the operating coils of a vibrator constructed according to my invention with a compensating inductance 263 and resistance 264 to compensate for undesired coupling between coil 150 and 151, as represented by inductance 261 and resistance 262 of Figure 26. When the oscillator of Figure 17, for example, is connected, the coupling coil 167 is in series circuit relation with coupling condenser 168, operating coil 150, inductance 263, and resistance 264. Similarly, the coupling inductance 165 of Figure 17 is in series circuit relation with the condenser 166, coupling coil 151, inductance 263 and resistance 264. The connections of the operating coil 150, or of the operating coil 151, are changed until it is evident that minimum effect is produced in the circuit by undesired coupling directly between the inductances 150 and 151, that is, by inductance 261 and resistance 262 of the equivalent circuit of Figure 26.

It is possible to produce such compensation because the undesired coupling represented by inductance 261 and resistance 262 of Figure 26 may be made, by such choice of connection of one of the coils 150 and 151, to have an effect in the circuit opposite to the effect produced by the inductance 263 and resistance 264. Therefore, the inductance 263 of Figure 27 must be made equal to the inductance 261 of the equivalent circuit of Figure 26, and similarly the resistance 264 of Figure 27 must be made equal to the resistance 262 of the equivalent circuit of Figure 26.

The structure illustrated in Figure 22 comprising the vibrating body 210 and the two separate coupling coils 211 and 212 may be connected in a somewhat different manner to provide certain advantages. If the two coils 211 and 212 be connected in series aiding relation, the structure becomes one in which a single coupling coil is electromagnetically arranged to excite vibration in a vibratory metallic body, and its equivalent circuit may be represented by that of Figure 15. There are important differences from a single coil structure in which the coil is on one side of the vibrating body, and these are that, while the losses represented by resistance 124 of Figure 15 and the inductance represented by the coil 123 of Figure 15 are only doubled, since there is substantially no mutual coupling between the two coils as they are shielded by the vibratory body, the impedance of the parallel resonant circuit including inductance 120, resistance 122 and condenser 121 is substantially quadrupled. That is, the electrical impedance which is reflected into the coupling coils by their coupling with the vibrating body due to its mechanical vibration is made to appear electrically four times as great as with a single one of the coils 211 and 212, while the inductance 123 and resistance 124 are only twice as great as when a single one of the coupling coils is used. This is a very important advantage since the electrical effect at the terminals of the network of Figure 15 of the mechanically vibrating body is much more pronounced than is the case when a single coupling coil on one side of the vibrating body is used.

If the two coupling coils 211 and 212 are connected in parallel aiding relation, a similar phenomenon takes place, the impedance of the equivalent tuned circuit 120, 121, 122 remaining the same, while the inductance 123 and resistance 124 appear to be only half as great.

Such a structure in which the two coupling coils 211 and 212 of Figure 22 are connected in aiding relation may be utilized in any place where a single vibrating body coupled to a single coupling coil may be utilized. For example, the oscillator of Figure 16 may be connected with that structure and have its operating frequency controlled thereby.

In Figure 28, there is illustrated an electromechanical vibrating system which is so arranged as to be especially useful in a bridge type filter circuit. In this device, two washer shaped vibrating bodies 270 and 271 are provided, each arranged to be excited in the same manner and in the same mode of oscillation as the vibrating body 70 of Figure 8. A permanent magnet structure 272 is arranged to produce a fixed magnetic field radially through the two vibrating bodies 270 and 271. A coupling coil 273 is arranged to produce an alternating field through the vibrating body 270 so as to excite it in a manner similar to the excitation of the body 70 by the loop 74 of Figure 8. Similarly, a coupling coil 274 is arranged near the vibrating body 271 so as to excite it in a similar manner.

One of the two bodies 270 and 271 is constructed in accordance with my invention so that it is mechanically resonant and vibrates with high efficiency when excited from its coupling coil. The other of the two vibrating bodies is so arranged, in some manner, that it is not capable of vibration at or near the frequency of operation of the other vibratory body. That vibratory body which it is desired shall not oscillate may be made slightly larger or smaller than the other vibratory body so that its natural frequency of vibration is removed by a substantial amount from the operating frequency of the vibrating body. The inoperative vibrating body may also be so constructed as to have a large amount of internal damping, whereby its oscillation is at the most small in amplitude. Further, the inoperative vibratory body may be clamped mechanically in some suitable fashion to prevent it from vibrating. Coupling directly between the coupling coils 273 and 274 is minimized desirably by the shielding provided by the washers 270 and 271.

With coupling between the two coupling coils 273 and 274 minimized, and with one of the vibrating bodies 270 and 271 made inoperative, the electrical characteristics at the terminals of the two coupling coils are identical over the entire frequency range except at frequencies very near the frequency at which the operative vibrating body is mechanically resonant. The two coupling coils of the structure of Figure 28 are therefore suitable for use as two arms of a bridge circuit, which may be constructed to be balanced at all frequencies except that at which the operative vibrating body is resonant. The mechanical identity of the structures associated with each of the coupling coils aids in maintaining their electrical identity over the entire frequency range except that at which the one operative vibrating body is mechanically resonant.

In Figure 29 there is illustrated a bridge circuit suitable for use with the device of Figure 28. Assuming that it is the vibratory body 271 of Figure 28 which is inoperative, and the vibratory body 270 which is mechanically resonant at a sharply defined frequency, the bridge circuit includes the operating coil 273 coupled to the vibratory body 270 as one arm, the coupling coil 274 coupled to the inoperative vibratory body 271 as another arm, and a pair of condensers 275 and 276 as the other two arms of the bridge. A bar 277 illustrated across the vibratory body 271 in Figure 29 indicates that it is clamped so that it cannot vibrate, or that it is made inactive at the frequency of vibration of body 270 in any desired manner.

In operation, since the coupling coils 273 and 274 are identical except near the resonant frequency of the body 270, and since the condensers 275 and 276 are of equal size and preferably of such size as to resonate with the operating coils 273 and 274 at approximately the mechanically resonant frequency of the body 270, the bridge balances at all frequencies except those very near the mechanically resonant frequency of the body 270. That is, voltage impressed between two diagonally opposite terminals 278 produces no effect between the other two diagonally opposite terminals 279, except at the mechanically resonant frequency of the body 270. Since the electrical impedance of the coupling coil 273 is much different from that of the coupling coil 274 near the mechanically resonant frequency of the body 270, voltages of such frequency impressed between the terminals 278 appear in large magnitude between the terminals 279.

With series resonance produced between the condenser 275 and coupling coil 274 at such frequency, the effect is exaggerated, since, near the mechanically resonant frequency of the body 270, the voltage across the coupling coil 274 or condenser 275 tends to become very high when a voltage is impressed between terminals 278, while the voltage across the coupling coil 273 or condenser 276 at the resonant frequency of body 270 is substantially smaller, so that the resulting coupling between terminals 278 and 279 is made large.

In Figure 30 there is illustrated an oscillator including a discharge device 280 coupled with a bridge circuit of the type illustrated in Figure 29 arranged to control the frequency of oscillation with high stability. In the bridge circuit many elements are identical with those illustrated in Figure 29, and are given like reference characters. In Figure 30 the equivalent electrical circuit of the coupling coil 273 and vibrating body 270 of Figure 29 is illustrated, and includes a parallel resonant circuit having an inductance 281 and condenser 282, the parallel resonant circuit being connected serially with an inductance 283.

The oscillator connections include an inductance 284 connected between the anode 285 of the discharge device 280 and the positive terminal of a source 286 of operating potential, the negative terminal of the source 286 being grounded. The cathode 287 of the discharge device 280 is grounded to complete a path for the flow of discharge current through the device 280. Terminals 279 of the bridge circuit are connected in shunt to the inductance 284 through a condenser 287', whereby the bridge circuit, the inductance 284, and the condenser 287' form a parallel resonant circuit at frequencies within a substantial range near the resonant frequency of the circuit 281, 282, that is, near the frequency of mechanical vibration of the body 270 of Figure 29. The range of frequencies over which this parallel circuit is resonant is substantially broader than the range of frequencies over which the body 270 is mechanically resonant.

Terminals 278 of the bridge circuit are connected to the terminals of a coupling inductance 288 which is inductively coupled with an inductance 289, which forms a parallel resonant circuit with a condenser 290, this parallel resonant circuit being resonant over the same band of frequencies as that over which the bridge circuit, the condenser 287', and the inductance 284 are resonant. One terminal of the tuned circuit 289, 290 is connected to the cathode 287 of device 280 and ground, and the other terminal is coupled through a coupling condenser 291 to the control electrode 292 of device 280. A grid resistance 293 is connected between the cathode 287 and the control electrode 292, and is of such size that oscillations impressed on the control electrode 292 through the coupling condenser 291 are rectified and produce a suitable operating bias potential for the control electrode 292 across the resistance 293.

In operation, this oscillator would tend to oscillate at a frequency within the relatively broad band of frequencies over which the resonant circuit 289, 290 and over which the resonant circuit including the bridge circuit, condenser 287' and inductance 284 are resonant, except for the fact that there is no feedback within this relatively broad band of frequencies through the bridge circuit, except within the relatively narrow band of frequencies within which the resonant circuit 281, 282 oscillates, that is, within the relatively narrow band of frequencies at which the body 270 of Figure 29 is mechanically resonant. Within this narrow band of frequencies, which, because of the low internal mechanical damping of the body 270 is of the order of tens of cycles at one megacycle, the bridge is unbalanced and causes a transfer of voltage from the inductance 284 through the condenser 287' and the unbalanced bridge circuit to the coupling inductance 288, and thus into the tuned control electrode circuit of the discharge device 280. By reason of the highly stable operating frequency of a vibrating body 270 constructed in accordance with my invention, the oscillator of Figure 30 is maintained at a highly constant frequency.

For the structure of Figure 28 as utilized in the bridge circuit oscillator of Figure 30 as explained previously, the structure illustrated in Figure 22 with the coupling coils 211 and 212 connected in aiding relation may be substituted for the vibrating body 270 and the coil 273, assuming that the vibrating body 270 is the active body. If this be done, it is of course desirable that by some means the inductance of the coil 274 be made equal to that of the coils 211 and 212, so connected in aiding relation. Of course, in the manner illustrated in Figure 28, the coils 211 and 212 and the washer 210 of Figure 22, and the body 271 and coil 284 of Figure 28 may all be combined in one structure.

It must be borne in mind that construction of vibratory bodies in accordance with my invention makes possible their operation at high frequencies by reason of the fact that they are so shaped that they can be, and are, coupled electrically to an electrical driving system so that substantially the entire mass of the vibratory body is excited from the driving system. Moreover, in all of the arrangements shown herein, suitable particularly for operation at frequency above 300 kilocycles, the vibratory body is vibrated in a mode and frequency determined by an intermediate dimension. This is quite apparent from the drawings and specification wherein in Figures 1 to 4 the vibratory bodies are vibrated in a mode determined by their respective widths. In Figures 5 to 11, 13, 17, 21, 22, 23 and 28 the washer-shaped members are also vibrated at a frequency determined by an intermediate dimension, such intermediate dimension being the radial width and the circumference being the longest dimension and the thickness being the smallest dimension. In the arrangement shown in Figure 12 the frequency of vibration is determined by the width of the vertical portions of the H-shaped member as indicated in Figure 12. In the modification shown in Figure 14 the frequency of vibration is determined by the circumference of the tubular member, the length of tubular member 110 being the longest dimension and the thickness of the tubular member 110 being the shortest dimension. It is understood that the longest dimension and even the thickness dimension exert some influence on the frequency of vibration but in the preferred embodiments shown herein the influence of the intermediate dimension predominates greatly.

One of the important features of the present invention resides in the fact that vibration is induced in a mode and frequency determined by an intermediate dimension. Such arrangement shown herein for producing vibration at a frequency determined by an intermediate direction results in relatively high emotional impedances of the vibratory body particularly useful in a range of frequencies wherein metallic bodies have previously found no utility.

Although, the resulting high emotional impedances produced by vibrating the metallic body at a frequency determined by an intermediate dimension are particularly useful at high frequency, such high emotional impedances are present also when the body is so shaped and so excited as to be operable at lower frequency at which prior art metallic bodies have found utility. That is, the resulting high motional impedance is produced at low frequencies also but becomes in comparison more pronounced and finds greatest utility at high frequencies where prior art metallic vibrating elements have been inoperative.

It is desired also to point out that, although I have illustrated and described certain preferred forms of my invention, specifically including certain methods of electrically exciting vibration in the vibratory bodies and specifically inducing certain modes of operation in those bodies, it is within the scope of my invention to provide other means for exciting the vibratory bodies and for exciting them in other modes of oscillation.

In review, it is noted that three species of my invention are disclosed herein i. e. (1) the species which I term the "magnetostrictive drive" exemplified in Figures 3, 4, 5, 8, 9, 10, 11, 14, 22, 28 and 29, (2) the species which I term the "electrodynamic" exemplified in Figures 1, 6, 7, 12, 13 and 17 and (3) the species which I term the "magnetic drive" exemplified in Figure 2. Although other species might suggest themselves in accordance with the teachings of the present invention one of the important features of the present invention is that the vibratory element exemplified in each one of these species is driven in a mode determined by an intermediate dimension.

While I have shown and described certain particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. In combination, a metallic vibratory body, said body having at least three dimensions of different magnitude, electromagnetic means for exciting substantially all of the mass of said body simultaneously into oscillation, and said electromagnetic means being so disposed with respect to said body such that said body oscillates in a mode determined substantially by a dimension of intermediate magnitude and in a direction perpendicular to a relatively small dimension of such magnitude that substantially all incremental portions of the body are acted upon by said electromagnetic means.

2. In combination, a vibratory body, said body having at least three dimensions of different magnitude, electromagnetic means comprising a coupling coil arranged to excite electromagnetically substantially every incremental portion of said body simultaneously into oscillation, and said coupling coil being so disposed with respect to said body such that said body oscillates in a mode determined substantially by a dimension of intermediate magnitude and in a direction perpendicular to a relatively small dimension of such magnitude that substantially all incremental portions of said body are acted upon by said electromagnetic means and vibrate at a natural frequency of vibration of said body.

3. In combination, a thin metallic vibratory body having an intermediate dimension and a relatively large dimension defining the volume of said thin body, electromagnetic means for exciting substantially all of the incremental portions of said body into vibration in directions normal to its thin dimension, and said electromagnetic means being so disposed with respect to said body such that said body oscillates in a mode determined substantially by said intermediate dimension, said thin dimension being of such magnitude that substantially all incremental portions of said body are acted upon said electromagnetic means and vibrate at a frequency determined by said intermediate dimension.

4. In combination, a flat thin metallic vibratory body having an intermediate dimension and a relatively large dimension defining the volume of said body, electromagnetic means for exciting substantially all of the incremental portions of said body into vibration in directions normal to its thin dimension, and said electromagnetic means being so disposed with respect to said body such that said body oscillates in a mode determined substantially by said intermediate dimension, said thin dimension being of such magnitude that substantially all incremental portions of said body are acted upon by said electromagnetic means and vibrate at a frequency determined by said intermediate dimension.

5. In combination, a vibratory body, two of the three dimensions of said vibratory body being substantially larger than the third dimension thereof, electromagnetic means for exciting substantially all of the incremental portions of said body into vibration in a mode such that the frequency of vibration of said body is determined substantially by a characteristic dimension normal to said third dimension said characteristic dimension being intermediate in magnitude between said third dimension and the larger of said two dimensions, and said electromagnetic means being so disposed with respect to said body such that said body oscillates in the direction of said characteristic dimension and in a direction perpendicular to said third dimension, said third dimension being of such magnitude that substantially all incremental portions of the body are acted upon by said electromagnetic means.

6. In combination, a vibratory body, three characteristic dimensions of said body being of substantially different magnitudes, electromagnetic means for exciting substantially all of the incremental portions of said body into vibration in a mode such that the frequency of vibration of said body is determined substantially by that characteristic dimension of intermediate magnitude, said electromagnetic means being so disposed with respect to said body such that said body oscillates in a direction perpendicular to its smallest dimension which is of such magnitude that substantially all incremental portions of said body are acted upon by the electromagnetic means and vibrates at the natural frequency of oscillation of said body.

7. In combination, a vibratory conducting body, said body having a thin dimension, a large dimension and an intermediate dimension, means for producing a magnetic field encompassing entirely said body, and means for inducing alternating current flow in substantially every incremental portion of said body for reaction with said field, the frequency of alternation of said induced current being substantially equal to a natural frequency of mechanical vibration of said body, said inducing means and said producing means being so disposed with respect to said body such that said body oscillates in the direction of the intermediate dimension and in a direction perpendicular to said thin dimension which is of such magnitude that substantially all incremental portions of the body are acted upon by said magnetic field and vibrate at a natural frequency of vibration of said body.

8. In combination, a vibratory body formed of a material whose dimensions change when said body is encompassed by a magnetic field, said body having at least three dimensions of different magnitude, electromagnetic means for producing a magnetic field having an alternating component and substantially encompassing said body whereby substantially every incremental portion of said body changes dimension in correspondence with said alternating component, and said electromagnetic means being disposed with respect to said body such that said body oscillates in a mode determined substantially by a dimension of intermediate magnitude and in a direction perpendicular to a relatively small dimension of such magnitude that substantially all incremental portions of said body are acted upon by said electromagnetic means, the frequency of alternation of said alternating component being substantially equal to a natural frequency of mechanical vibration of said body in the direction of said intermediate dimension.

9. In combination, a metallic vibratory body formed of a material such that a natural frequency of vibration of said body does not change substantially upon changes in temperature over a range of substantially elevated temperatures, said body having at least three dimensions of different magnitudes, electromagnetic means for exciting substantially every incremental portion of said body into vibration, said electromagnetic means being disposed with respect to said body such that said body oscillates in a mode determined substantially by a dimension of intermediate magnitude and in a direction perpendicular to a relatively small dimension which is of such magnitude that substantially all incremental portions of the body are acted upon by said electromagnetic means.

10. In combination, a metallic vibratory body having a thin dimension, an intermediate dimension, and a relatively large dimension such that its natural frequency of vibration is substantially higher than 300 kilocycles when vibrating in a fundamental mode substantially determined by said intermediate dimension, electromagnetic means for exciting force in substantially every incremental portion of said body to cause vibration of said body substantially at its natural mechanical frequency of vibration in said mode and said electromagnetic means being disposed with respect to said body such that said body oscillates in a direction perpendicular to said thin dimension which is of such magnitude that substantially all incremental portions of said body are acted upon by said electromagnetic means.

11. In combination, a vibratory body having at least three dimensions of different magnitude, electromagnetic means comprising a pair of coupling coils of which one is arranged to excite electromagnetically substantially every incremental portion of said body into motion to cause mechanical vibration of said body substantially at its natural frequency, said other coupling coil being arranged with respect to said body to develop an alternating potential in response to vibration of said body, and said electromagnetic means being so disposed with respect to said body such that said body oscillates in a mode substantially determined by a dimension of intermediate magnitude and in a direction perpendicular to a relatively small dimension of such magnitude that substantially all incremental portions of the body are acted upon by said electromagnetic means.

12. In combination, a vibratory body, means comprising a pair of coupling coils each arranged to excite electrically substantially every incremental portion of said body into motion to cause mechanical vibration of said body substantially at its natural frequency, said coupling coils having an undesirable mutual inductance, means for exciting said body into vibration through one of such coupling coils whereby a voltage is developed across the other of said coupling coils when said body vibrates, and common impedance means in circuit with both of said coupling coils for minimizing the effect of said mutual coupling between said coupling coils.

13. In combination, a vibratory metallic body, said body having at least three dimensions of different magnitudes, electromagnetic means for exciting substantially all of the mass of said body simultaneously into oscillation, and electric circuit means for sustaining continuously such oscillation, said electromagnetic means being so disposed with respect to said body such that said body oscillates in a mode substantially determined by a dimension of intermediate magnitude and in a direction perpendicular to a relatively small dimension which is of such magnitude that substantially all incremental portions of the body are acted upon by said electromagnetic means, said intermediate dimension being substantially perpendicular to the longest dimension of said body such that a relatively large motional impedance is introduced into said electrical circuit whereby said body may be locked in step with said electrical circuit particularly at high frequencies.

14. In combination, a vibratory metallic body, said body having at least three dimensions of different magnitude, electromagnetic means for exciting substantially every incremental portion of the mass of said body simultaneously into oscillation, oscillating electric circuit means for sustaining continuously such oscillation, said electromagnetic means being so disposed with respect to said body such that said body oscillates in a mode substantially determined by a dimension of intermediate magnitude and in a direction perpendicular to a relatively small dimension which is of such magnitude that substantially all incremental portions of said body are acted upon by said electromagnetic means, said intermediate dimension being substantially perpendicular to the longest dimension of said body such that the motional impedance introduced into said oscillating electric circuit is relatively large whereby said body vibrates in synchronism with said electric circuit particularly at high frequencies.

15. In combination, two vibratory bodies, one of said bodies being active and excitable into mechanical oscillation at its natural frequency of vibration and the other of said bodies being inactive at such frequency, and means comprising a coupling coil electromagnetically associated with each of said bodies in similar fashion for affecting said associated body electromagnetically whereby said active body vibrates at its natural mechanical frequency when voltage of such frequency is imposed on the coil associated therewith, said coupling coil associated with said active body and said other coupling coil having substantially identical electrical characteristics except at frequencies near the natural frequency of vibration of said active body and said bodies and coils being associated with each other in the same environment whereby electrical characteristics of said coils are similarly affected by surrounding conditions.

16. In combination, two vibratory bodies, one of said bodies being active and excitable into mechanical oscillation at its natural frequency of vibration and the other of said bodies being inactive at such frequency, means comprising a coupling coil electromagnetically associated with each of said bodies in similar fashion for affecting said associated body electromagnetically whereby said active body vibrates at its natural mechanical frequency when voltage of such frequency is imposed on the coil associated therewith, said coupling coil having substantially identical electrical characteristics except at frequencies near the natural frequency of vibration of said active body and said bodies and coils being associated with each other in the same environment whereby electrical characteristics of said coils are similarly affected by surrounding conditions, said two coupling coils forming two arms of a bridge, and two substantially equal impedances respectively forming the other two arms of said bridge, said bridge thereby being balanced at all frequencies except at frequencies near the frequency of natural vibration of said active body, and said bridge being unbalanced at said last frequencies whereby voltage transfer takes place between the opposite diagonals of said bridge.

17. In combination, two vibratory bodies, one of said bodies being active and excitable into mechanical oscillation at its natural frequency of vibration and the other of said bodies being inactive at such frequency, means comprising a coupling coil electromagnetically associated with each of said bodies in similar fashion for affecting said associated body electromagnetically whereby said active body vibrates at its natural mechanical frequency when voltages of such frequency is imposed on the coil associated therewith, said coupling coil having substantially identical electrical characteristics except at frequencies near the natural frequency of vibration of said active body and said bodies and coils being associated with each other in the same environment whereby electrical characteristics of said coils are similarly affected by surrounding conditions, said two coupling coils forming two arms of a bridge, and a pair of capacities forming the other two arms of said bridge, said capacities being of such magnitude that a substantially resistive impedance appears across each diagonal of said bridge at the frequency at which said active body vibrates at its natural frequency whereby said bridge is unbalanced to produce voltage transfers between said diagonals only at frequencies very near said natural frequency.

18. In combination, a vibratory body, said body having at least three dimensions of different magnitude, electromagnetic means comprising a pair of coupling coils of which one is arranged to excite electromagnetically substantially every incremental portion of said body into motion to cause mechanical vibration of said body substantially at its natural frequency, said other coupling coil being arranged with respect to said body to develop an alternating potential in response to vibration of said body, and means for amplifying voltages upon said one coil in sufficient intensity to maintain said body in sustained oscillation, said electromagnetic means being so disposed with respect to said body such that said body oscillates in a mode substantially determined by a dimension of intermediate magnitude and in a direction perpendicular to a relatively small dimension which is of such magnitude that substantially all incremental portions of the body are acted upon by said electromagnetic means, said intermediate dimension being substantially perpendicular to the longest of said three dimensions such that the motional impedance introduced is of relatively large magnitude whereby said body vibrates in synchronism with said sustained oscillations particularly at high frequencies.

19. In combination, two vibratory bodies, one of said bodies being active and excitable into mechanical oscillation at its natural frequency of vibration and the other of said bodies being inactive at such frequency, said active body having at least three dimensions of different magnitudes, electromagnetic means comprising a coupling coil electromagnetically associated with each of said bodies in similar fashion for affecting said associated body electromagnetically whereby said active body vibrates at its natural mechanical frequency when voltage of such frequency is imposed on the coil associated therewith, said electromagnetic means being so disposed with respect to said active body such that said active body oscillates in a mode substantially determined by a dimension of intermediate magnitude and in a direction perpendicular to a relatively small dimension which is of such magnitude that substantially all incremental portions of the body are acted upon by said electromagnetic means, said intermediate dimension being substantially perpendicular to the longest of said three dimensions such that the reflected motional impedance is relatively high whereby said active body may be locked in synchronism with an oscillating circuit coupled thereto particularly at high frequencies, said coupling coils having substantially identical electrical characteristics except at frequencies near the natural frequency of vibration of said active body and said bodies and coils being associated with each other in the same environment whereby electrical characteristics of said coils are similarly affected by surrounding conditions, said two coupling coils forming two arms of a bridge, two substantially equal impedances respectively forming the other two arms of said bridge, said bridge thereby being balanced at all frequencies except at frequencies near the frequency of natural vibration of said active body, and said bridge being unbalanced at said last frequencies whereby voltage transfer takes place between the opposite diagonals of said bridge, and means for amplifying voltage across one diagonal of said bridge and applying it in sufficiently amplified intensity across the other diagonal of said bridge to maintain said active body in sustained oscillation.

20. In combination, two vibratory bodies, one of said bodies being active and excitable into mechanical oscillation at its natural frequency of vibration and the other of said bodies being inactive at such frequency, said active body having at least three dimensions of different magnitudes, electromagnetic means comprising a coupling coil electromagnetically associated with each of said bodies in similar fashion for affecting said associated body electromagnetically whereby said active body vibrates at its natural mechanical frequency when voltages of such frequency is imposed on the coil associated therewith, said electromagnetic means being disposed with respect to said body such that said body oscillates in a mode substantially determined by a dimension of intermediate magnitude and in a direction perpendicular to a relatively small dimension which is of such magnitude that substantially all incremental portions of the body are acted upon by said electromagnetic means, said intermediate dimension being substantially perpendicular to the longest of said three dimensions such that reflected motional impedance is relatively high whereby said body may be locked in synchronism with an oscillating circuit coupled thereto particularly at high frequencies, said coupling coil having substantially identical electrical characteristics except at frequencies near the natural frequency of vibration of said active body and said bodies and coils being associated with each other in the same environment whereby electrical characteristics of said coils are similarly affected by surrounding conditions, said two coupling coils forming two arms of a bridge, a pair of capacities forming the other two arms of said bridge, said capacities being of such magnitude that a substantially resistive impedance appears across each diagonal of said bridge at the frequency at which said active body vibrates at its natural frequency whereby said bridge is unbalanced to produce voltage transfers between said diagonals only at frequencies very near said natural frequency, a parallel tuned circuit including in series with one of its elements that diagonal of said bridge across which said capacities are connected in series, and means for transferring between the terminals of said parallel tuned circuit and the other diagonal of said bridge alternating voltage in sufficiently amplified intensity to maintain said active body in continuous oscillation.

21. In combination, a vibratory metallic body, said body having at least three dimensions of different magnitudes, electromagnetic means comprising a coupling coil electromagnetically coupled with said body for exciting substantially every incremental portion of the mass of said body simultaneously into oscillation, said electromagnetic means being so disposed with respect to said body such that said body oscillates in a mode substantially determined by a dimension of intermediate magnitudes and in a direction perpendicular to a relatively small dimension which is of such magnitude that substantially all incremental portions of said body are acted upon by said electromagnetic means, said intermediate dimension being substantially perpendicular to the longest of said three dimensions such that the motional impedance transferred into the coil coupled thereto is relatively high whereby said body is locked in step with electromagnetic oscillation coupled thereto particularly at high frequencies, and electric circuit means comprising an amplifier and said coupling coil for sustaining continuously such oscillation.

22. In combination, a vibratory metallic body, said body having at least three dimensions of different magnitude, electromagnetic means including a coupling coil electromagnetically coupled with said body for exciting substantially every incremental portion of the mass of said body simultaneously into oscillation, an amplifier, and means for transferring from the output to the input of said amplifier energy sufficient to maintain said amplifier in continuous oscillation, said last means comprising electric circuit means including said coupling coil and being effective to transfer energy between the output and input of said amplifier substantially only at the natural frequency of mechanical vibration of said body, said electromagnetic means being so disposed with respect to said body such that said body oscillates in a mode determined substantially by a dimension of intermediate magnitude and in a direction perpendicular to a relatively small dimension which is of such magnitude that substantially all incremental portions of the body are acted upon by said electromagnetic means, said intermediate dimension being substantially perpendicular to the longest of said three dimensions whereby the reflected motional impedance of said body produced by vibration causes it to lock in step with electrically produced oscillation particularly at high frequencies.

23. A mechanical oscillatory body formed of a thin sheet of metal and having a circular perimeter and a central opening, said body being of such dimensions that it oscillates at a natural frequency above one quarter of a megacycle in a direction normal to said thin dimension and being formed of such metal that the frequency of oscillation is substantially invariant with respect to temperature.

24. A mechanical oscillatory body formed of a thin sheet of metal and having an opening therein, said body being of such dimensions and of such metal as to vibrate at a natural frequency above one quarter of a megacycle in a direction normal to its thin dimension, said metal having physical characteristics such that the frequency of oscillation is substantially invariant with respect to temperature.

25. A mechanical oscillatory body formed of a thin sheet of metal and having an irregularly shaped central opening whereby it may be held against rotation for oscillation in a preferred orientation, said body being of such dimensions and of such metal as to vibrate at a natural frequency above one quarter of a megacycle in a direction normal to its thin dimension, said metal having physical characteristics which change upon temperature change in such fashion that the frequency of oscillation is substantially invariant with respect to temperature.

26. In combination, at least one metallic vibratory body, said body having at least three dimensions of different magnitudes, means for producing a magnetic field encompassing substantially entirely said body, electromagnetic means cooperating with said magnetic field for exciting substantially all of the mass of said metallic body simultaneously into vibration, said electromagnetic means being so disposed with respect to said body such that said body oscillates in a mode determined by a dimension of intermediate magnitude and in a direction perpendicular to a relatively small dimension of such magnitude that substantially all incremental portions of the body are acted upon by said electromagnetic means and the frequency of oscillation of said body is determined by said intermediate dimension, an amplifying device, means including said amplifying device for producing an oscillating current, means coupling said oscillating current producing means to said electromagnetic means, said electromagnetic means being so arranged to produce vibration in a mode determined substantially by the intermediate dimension of the body, vibration of said body producing an electromagnetic reaction on said electromagnetic means, whereby the reflected motional impedance of said body reflected into said oscillation producing means produces a relatively large effect of stabilizing said oscillation producing means particularly at high frequency.

27. In the method for producing vibratory movement at a natural frequency of a metallic body having at least three unequal dimensions, the step comprising: producing sustantial vibrating forces in said body to act in the direction of an intermediate dimension of the body whereby such intermediate dimension determines the frequency of vibration of said body and its reflected motional impedance is relatively high.

28. In the method for producing vibratory movement at a natural frequency of a metallic body having at least three unequal dimensions, the step comprising: producing substantial vibratory forces acting in such directions to produce a mode of vibration the frequency of which is substantially determined by an intermediate dimension of the body.

29. In the method for producing vibratory movement at a natural frequency of a metallic body having at least three unequal dimensions, the steps comprising: encompassing the entire body in a magnetic field of substantially constant intensity simultaneously subjecting the body to varying electromagnetic flux in such a direction with respect to the body that it vibrates in such a mode that an intermediate dimension determines the frequency of vibration of said body whereby its reflected motional impedance is relatively high.

30. In combination, at least one metallic vibratory body, said body having magnetostrictive properties and having at least three dimensions of different magnitude, means for producing a magnetic field encompassing entirely substantially said body, electromagnetic means cooperating with said magnetic field for exciting by magnetostrictive action substantially all of the mass of said metallic body simultaneously into vibration, said electromagnetic means being so disposed with respect to said body such that said body oscillates in a mode determined by a dimension of intermediate magnitude and in a direction perpendicular to a relatively small dimension of such magnitude that substantially all incremental portions of the body are acted upon by said electromagnetic means and the frequency of oscillation of said body is determined by said intermediate dimension, an amplifying device, means including said amplifying device for producing an oscillating current, means coupling said oscillating current producing means to said electromagnetic means, said electromagnetic means being arranged to produce vibration in a mode determined substantially by the intermediate dimension of the body, vibration of said body producing a magnetostrictive reaction on said electromagnetic means, whereby the reflected motional impedance of said body reflected into said oscillation producing means produces a relatively large effect of stabilizing said oscillation producing means particularly at high frequency.

31. In combination, at least one metallic vibratory body, said body being nonmagnetic of electricity conducting material and having at least three dimensions of different magnitude, means for producing a magnetic field encompassing substantially entirely said body, electromagnetic means cooperating with said magnetic field for inducing currents in said body and exciting by interaction with said magnetic field substantially all of the mass of said metallic body simultaneously into vibration, said electromagentic means being so disposed with respect to said body such that said body oscillates in a mode determined by a dimension of intermediate magnitude and in a direction perpendicular to a relatively small dimension of each magnitude that substantially all incremental portions of the body are acted upon by said electromagnetic means and the frequency of oscillation of said body is determined by said intermediate dimension, an amplifying device, means including said amplifying device for producing an oscillating current, means coupling said oscillating current producing means to said electromagnetic means, said electromagnetic means being arranged to produce vibration in a mode determined substantially by the intermediate dimension of the body, vibration of said body producing an electromagnetic reaction on said electromagnetic means, whereby the reflected motional impedance of said body reflected into said oscillation producing means produces a relatively large effect of stabilizing said oscillation producing means particularly at high frequency.

32. In combination, at least one metallic vibratory body, said body being of magnetic material and having at least three dimensions of different magnitude, means for producing a magnetic field encompassing substantially entirely said body, electromagnetic means cooperating with said magnetic field for exciting substantially all of the mass of said metallic body simultaneously into vibration, said electromagnetic means being so disposed with respect to said body such that said body oscillates in a mode determined by a dimension of intermediate magnitude and in a direction perpendicular to a relatively small dimension of such magnitude that substantially all incremental portions of the body are acted upon by said electromagnetic means and the frequency of oscillation of said body is determined by said intermediate dimension, an amplifying device, means including said amplifying device for producing an oscillating current, means coupling said oscillating current producing means to said electromagnetic means, said electromagnetic means being arranged to produce vibration in a mode determined substantially by the intermediate dimension of the body, vibration of said body producing an electromagnetic reaction on said electromagnetic means, whereby the reflected motional impedance of said body reflected into said oscillation producing means produces a relatively large effect of stabilizing said oscillation producing means particularly at high frequency.

33. In combination, a metallic vibratory body, said body having at least three dimensions of different magnitude, means for producing a magnetic field encompassing substantially entirely said body, electromagnetic means cooperating with said magnetic field and producing shear forces within said body for exciting substantially all of the mass of said metallic body simultaneously into vibration, said electromagnetic means being so disposed with respect to said body such that said body oscillates in a shear mode determined substantially by a dimension of intermediate magnitude and in a direction perpendicular to a relatively small dimension of such magnitude that substantially all incremental portions of the body are acted upon by said electromagnetic means and the frequency of oscillation is determined by said intermediate dimension.

ROBERT ADLER.

REFERENCES CITED

The following references are of record in the file of this patent:

UNITED STATES PATENTS

| Number | Name | Date |
|---|---|---|
| 1,750,124 | Pierce | Mar. 11, 1930 |
| 1,934,061 | Hansell | Nov. 7, 1933 |
| 2,303,132 | Murray | Nov. 24, 1942 |
| 1,882,397 | Pierce | Oct. 11, 1932 |
| 2,052,008 | Woodruff | Aug. 25, 1936 |
| 2,139,220 | Blackman | Dec. 6, 1938 |
| 2,166,359 | Lakatos | July 18, 1939 |
| 1,996,504 | Darlington | Apr. 2, 1935 |
| 1,811,127 | Harrison | June 23, 1931 |
| 1,763,853 | Karolus | June 17, 1930 |
| 1,937,583 | Norrman | Dec. 5, 1933 |
| 2,018,318 | Purington | Oct. 22, 1935 |
| 2,284,545 | Usselman | May 26, 1942 |
| 2,163,403 | Meacham | June 20, 1939 |
| 514,882 | Elliot | Feb. 13, 1894 |
| 824,382 | Quitman | June 26, 1906 |
| 2,063,335 | Person | Dec. 8, 1936 |

FOREIGN PATENTS

| Number | Country | Date |
|---|---|---|
| 839,574 | France | Jan. 4, 1939 |

Certificate of Correction

Patent No. 2,435,487.    February 3, 1948.

ROBERT ADLER

It is hereby certified that errors appear in the printed specification of the above numbered patent requiring correction as follows: Column 3, line 16, for "ow" read *of*; column 12, line 38, strike out "anad" and insert instead the word *and*; column 20, line 69, strike out the word "the", first occurrence; column 29, lines 12, 16, and 20, strike out "emotional" and insert instead *motional*; column 38, line 22, claim 31, for "electromagentic" read *electromagnetic*; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*